US008514962B2

(12) United States Patent
To et al.

(10) Patent No.: US 8,514,962 B2
(45) Date of Patent: Aug. 20, 2013

(54) COMMUNICATION DEVICE

(75) Inventors: Shimpei To, Chiba (JP); Yasuhiro Hamaguchi, Chiba (JP); Hideo Nanba, Chiba (JP); Seiichi Sampei, Osaka (JP); Hiroshi Harada, Tokyo (JP); Masafumi Moriyama, Tokyo (JP)

(73) Assignees: Sharp Kabushiki Kaisha, Osaka (JP); Osaka University, Osaka (JP); National Institute of Information and Communications Technology, Tokyo (JP)

( * ) Notice: Subject to any disclaimer, the term of this patent is extended or adjusted under 35 U.S.C. 154(b) by 74 days.

(21) Appl. No.: 12/752,797

(22) Filed: Apr. 1, 2010

(65) Prior Publication Data

US 2010/0254497 A1    Oct. 7, 2010

Related U.S. Application Data

(62) Division of application No. 11/795,309, filed as application No. PCT/JP2006/300422 on Jan. 16, 2006, now Pat. No. 8,270,514.

(30) Foreign Application Priority Data

Jan. 17, 2005   (JP) ................. 2005-009448

(51) Int. Cl.
*H04B 7/02* (2006.01)
*H04L 1/02* (2006.01)

(52) U.S. Cl.
USPC .......................... 375/267; 375/340

(58) Field of Classification Search
USPC ............ 375/141, 143, 147, 150, 260, 267, 375/340
See application file for complete search history.

(56) References Cited

U.S. PATENT DOCUMENTS 6,574,283 B1    6/2003    Sakoda et al.
6,807,145 B1    10/2004   Weerackody et al.
(Continued)

FOREIGN PATENT DOCUMENTS

JP    11-68696    3/1999
JP    2001-127675  5/2001
(Continued)

OTHER PUBLICATIONS

Wiegandt, "High-Throughput, High-Performance OFDM via Pseudo-Orthogonal Carrier Interferometry Spreading Codes," IEEE Transactions on Communications, vol. 51, No. 7, 2003, pp. 1123-1134.

(Continued)

*Primary Examiner* — David B Lugo
(74) *Attorney, Agent, or Firm* — Birch, Stewart, Kolasch & Birch, LLP

(57) ABSTRACT

Improving the accuracy of estimation of channel responses in receiving signals from a plurality of antennas is disclosed. A transmitting device of a base station includes a preamble A generating unit 010, a preamble B generating unit 011, phase rotating units 012 and 013, multiplexing units 014 and 015, an forward error correction coding unit 016, an S/P converting unit 017, a mapping unit 018, a changeover switch 019, IDFT (or IFFT) units 020 and 026, P/S converting units 021 and 027, GI (Guard Interval) inserting units 022 and 028, D/A converting units 023 and 029, radio transmitting units 024 and 030 and antenna units 025 and 031. In the preamble A generating unit 010 and the preamble B generating unit 011, a preamble A and a preamble B (see the packet format in FIG. 1) are generated, respectively. The preamble A is outputted to the multiplexing units 014 and 015, while the preamble B is outputted to the phase rotating units 012 and 013. The phase rotating units 012 and 013 to which the preamble B has been inputted give continuous phase rotation to subcarriers of the preamble B. In the transmitting device of the base station according to this embodiment, the phase rotating unit 012 does not give phase rotation, but only the phase rotating unit 013 gives phase rotation to the preamble B.

7 Claims, 14 Drawing Sheets

(56) References Cited

U.S. PATENT DOCUMENTS

| | | |
|---|---|---|
| 6,831,943 B1 | 12/2004 | Dabak et al. |
| 7,099,270 B2 * | 8/2006 | Yamaguchi .................. 370/208 |
| 7,715,464 B2 * | 5/2010 | Jonsson et al. ............... 375/148 |
| 2003/0054812 A1 * | 3/2003 | Hunzinger .................... 455/423 |
| 2004/0156386 A1 | 8/2004 | Atarashi et al. |
| 2004/0162021 A1 * | 8/2004 | Seki et al. ..................... 455/39 |
| 2004/0165650 A1 * | 8/2004 | Miyazaki et al. ............. 375/141 |
| 2004/0180627 A1 | 9/2004 | Dabak et al. |
| 2005/0025223 A1 | 2/2005 | Dabak et al. |
| 2005/0026566 A1 | 2/2005 | Dabak et al. |
| 2005/0105460 A1 * | 5/2005 | Suh et al. ..................... 370/203 |
| 2005/0286484 A1 | 12/2005 | Nakao et al. |
| 2005/0286562 A1 | 12/2005 | Nakao et al. |
| 2006/0067420 A1 | 3/2006 | Li et al. |
| 2007/0242600 A1 * | 10/2007 | Li et al. ........................ 370/210 |

FOREIGN PATENT DOCUMENTS

| | | |
|---|---|---|
| JP | 2001-333043 | 11/2001 |
| JP | 2002-94483 | 3/2002 |
| JP | 2004-64670 | 4/2004 |
| JP | 2004-254192 | 9/2004 |
| JP | 2004-297756 | 10/2004 |
| JP | 2006-14321 A | 1/2006 |
| JP | 2006-50573 A | 2/2006 |
| JP | 2006-101501 A | 4/2006 |
| JP | 2006-1410361 A | 6/2006 |
| JP | 2007-531384 A | 11/2007 |
| JP | 2008-508803 A | 3/2008 |
| WO | WO 2005/081480 A1 | 9/2005 |
| WO | WO 2005/107121 A1 | 11/2005 |
| WO | WO 2005/117321 A1 | 12/2005 |
| WO | WO 2005/122516 A1 | 12/2005 |
| WO | WO 2006/001898 A1 | 1/2006 |
| WO | WO 2006/015108 A2 | 2/2006 |

OTHER PUBLICATIONS

Japanese Office Action issued in Japanese Patent Application No. 2010-210421 on Dec. 11, 2012.

European Search Report issued in European Patent Application No. 06711703.6 on Jan. 31, 2013.

* cited by examiner

COMMUNICATION DEVICE

This application is a divisional of U.S. patent application Ser. No. 11/795,309 filed on Jul. 16, 2007, now U.S. Pat. No. 8,270,514 which is a National Phase of PCT/JP2006/300422 filed on Jan. 16, 2006, which claims priority under 35 U.S.C. 119(a) to Patent application No. JP 2005-009448 filed in Japan on Jan. 17, 2005, all of which are hereby expressly incorporated by reference in their entirety.

TECHNICAL FIELD

The present invention relates to a communication device, and particularly to a radio transmitting device comprising a plurality of antennas and to a radio receiving device for receiving signals from the radio transmitting device.

BACKGROUND ART

In recent years, many more users demand fast data transmission in a radio communication system as the volume of communication increases. The multicarrier transmission represented by OFDM (Orthogonal Frequency Division Multiplexing) gets attention as a way of communication to realize the fast and high-volume data transmission. The OFDM, which is used in IEEE 802.11a being a radio system of a 5 GHz-band or digital terrestrial broadcast, provides for simultaneous communication by arranging tens to thousands of carriers in a minimum frequency interval that does not induce interference theoretically. Generally in OFDM, these carriers are referred to as subcarriers which are digitally modulated with PSK, QAM or the like for communication. It is known that OFDM and forward error correction are combined to obtain strong tolerance to frequency selective fading.

The configuration of a data packet according to the IEEE 802.11a will be described with reference to FIG. 1. As shown in FIG. 1, a data packet used in the IEEE 802.11a consists of preambles A and B and a data signal. A preamble A is used for OFDM symbol synchronization and frequency synchronization, while a preamble B is used for identification of an antenna and estimation of a channel response. The two preambles are both predetermined signals, being signals also known to a receiving side.

FIGS. 12 and 13 show configuration examples of an OFDM modulating circuit and an OFDM demodulating circuit, respectively. In the drawings, the number of subcarriers in use is defined as N.

FIG. 12 is a functional block diagram of a usual OFDM modulation circuit. In FIG. 12, reference numeral 1000 denotes an forward error correction coding unit, reference numeral 1001 denotes a serial/parallel converting unit (S/P converting unit), reference numeral 1002 denotes a mapping unit, reference numeral 1003 denotes an IDFT (Inverse Discrete Fourier Transform) unit, reference numeral 1004 denotes a parallel/serial (P/S converting unit), reference numeral 1005 denotes a preamble A generating unit, reference numeral 1006 denotes a preamble B generating unit, reference numeral 1007 denotes a multiplexing unit, reference numeral 1008 denotes a guard interval inserting unit, reference numeral 1009 denotes a digital/analog converting unit (D/A converting unit), reference numeral 1010 denotes a radio transmitting unit and reference numeral 1011 denotes an antenna.

Transmitted information data is encoded in the forward error correction coding unit 1000. Then, the S/P converting unit 1001 performs serial/parallel conversion on the data by a data amount needed to modulate each carrier. The mapping unit 1002 modulates each carrier. Afterward, the IDFT unit 1003 performs IDFT. Although an example of using IDFT for OFDM modulation is illustrated herein, a general circuit often defines the number of points in a format $2^n$ and uses the fast inverse Fourier transform (IFFT). In order to generate an OFDM signal of an N wave, a value $2^n$ not less than N and nearest to N is generally used as the number of points of IFFT.

After the IDFT, the P/S converting unit 1004 converts the data into serial data, and then the multiplexing unit 1007 time-multiplexes the data with the preambles A and B, resulting in the packet configuration shown in FIG. 1. Then, the GI (guard interval) inserting unit 1008 inserts a guard interval. A guard interval is inserted to reduce interference between symbols in receiving an OFDM signal. Further, the data is converted into an analog signal in the D/A converting unit 1009 and then converted into a transmission frequency in the radio transmitting unit 1010, and finally a packet is transmitted from the antenna 1011.

FIG. 13 is a functional block diagram showing a configuration example of an OFDM demodulating circuit. As shown in FIG. 13, a receiver conducts reverse processing of the transmission in principle. In FIG. 13, reference numeral 1020 denotes an antenna, reference numeral 1021 denotes a radio receiving unit, reference numeral 1022 denotes an A/D (analog/digital) converting unit, reference numeral 1023 denotes a synchronizing unit, reference numeral 1024 denotes a GI removing unit, reference numeral 1025 denotes an S/P converting unit, reference numeral 1026 denotes a DFT (Discrete Fourier Transform) unit, reference numeral 1027 denotes a changeover switch, reference numeral 1028 denotes a preamble multiplying unit, reference numerals 1029 and 1030 denote multiplying units, reference numeral 1031 denotes a demapping unit, reference numeral 1032 denotes a P/S converting unit and reference numeral 1033 denotes an forward error correction decoding unit. However, also a demodulating circuit often uses FFT instead of DFT, as described above.

An electric wave received in the antenna unit 1020 is frequency-converted into a frequency band in which A/D conversion is possible in the radio receiving unit 1021. The A/D converting unit 1022 converts the data into a digital signal, for which the synchronizing unit 1023 conducts OFDM symbol synchronization using the preamble A. The GI removing unit 1024 removes a guard interval from the data. Afterward, the S/P converting unit 1025 performs serial/parallel conversion on the data. Then, the DFT unit 1026 performs DFT on the data, the changeover switch 1027 transmits the received preamble B subjected to DFT to the preamble multiplying unit 1028 and transmits the received data signal subjected to DFT to the multiplying unit 1029. The preamble multiplying unit 1028 multiplies (multiplies in a frequency domain) a complex conjugate of the received preamble B and the preamble B used in a transmitting side to estimate a channel response. In the following, estimation of a channel response using a preamble (preamble B) being a known signal and compensation of a channel response will be briefly described using numerical expressions. First, a preamble used in a transmitting side is represented by p(f) and an information signal is represented by s(f). Those are expressed as frequency domain signals herein. Additionally, after transmission of a preamble or an information signal, if channel response is defined as c(f), a received preamble p'(f) and a received information signal s'(f) are represented by the following equations. In the equations, c(f) is a complex function to give different amplitude and phase rotation for each subcarrier.

Equation 1

$$p'(f)=c(f) \times p(f) \tag{1}$$

$$s'(f)=c(f) \times s(f) \tag{2}$$

However, thermal noise in a receiver is not considered herein for simplicity. For the receive signals, first, a complex conjugate of p'(f) is obtained in the preamble multiplying unit 1028, and the conjugate is multiplied by the preamble p(f) used in the transmitting side, as described previously. This multiplication is represented in the equation (3):

Equation 2
$$p'^*(f) \times p(f) = c^*(f) \times p^*(f) \times p(f) \quad (3)$$
$$= c^*(f) \times |p(f)|^2$$

The output (equation (3)) of the preamble multiplying unit 1028 is transmitted to the multiplying units 1029 and 1030, which multiply the output by a received data signal and a received preamble, respectively. An output of the multiplying unit 1029 is shown in the equation (4) and an output of the multiplying unit 1030 is shown in the equation (5):

Equation 3
$$s'(f) \times c^*(f) \times |p(f)|^2 = c(f) \times c^*(f) \times s(f) \times |p(f)|^2 \quad (4)$$
$$= |c(f)|^2 |p(f)|^2 \times s(f)$$
$$p'(f) \times c^*(f) \times |p(f)|^2 = c(f) \times c^*(f) \times p(f) \times |p(f)|^2 \quad (5)$$
$$= |c(f)|^2 |p(f)|^2 \times p(f)$$

As shown in the equation (4), a received information signal is multiplied by an output of the preamble multiplying unit 1028, whereby influence of phase rotation by channel response c(f) is compensated and a signal having a phase equal to a transmitted signal s(f) is obtained. Then, the outputs (equations (4) and (5)) of the multiplying units 1029 and 1030 obtained in this way are inputted to the demapping unit 1031. A preamble subjected to channel response compensation in the equation (5) is used as a criterion to demap an information signal for each subcarrier. Then, the P/S converting unit 1032 serializes necessary data, the forward error correction decoding unit 1033 decodes the transmitted data.

One of examples of aiming fast and high-quality OFDM includes the way disclosed in the non-patent literature 1. Generally, different information bits are assigned to OFDM subcarriers. However, according to the non-patent literature 1, an identical information bit is assign to all subcarriers. In order to assign an identical information bit to all subcarriers in this way and keep a high transmission rate, the non-patent literature 1 proposes to set a different amount of phase rotation for each information bit and give the phase rotation being set to subcarriers, thereby enabling to assign different information bits to an identical subcarrier for transmission.

FIG. 14 shows a part of transmitter configuration disclosed in the non-patent literature 1. As shown in FIG. 14, in a transmitting device according to the non-patent literature 1, an information bit (for BPSK modulation in the non-patent literature 1) mapped by a mapping unit 1050 is copied by the number of subcarriers (the number of subcarriers is N herein) by copy units 1051 and inputted to subcarrier demodulating and phase rotating units 1052. The subcarrier demodulating and phase rotating units 1052 assign information bits to all subcarriers and give phase rotation being set for each information bit to each subcarrier, as shown in FIG. 14. At that time, continuous phase rotation for adjacent subcarriers is given such that phase rotation given to the first subcarrier of a k-th information bit is 0, while phase rotation given to an n-th subcarrier is $(n-1)\Delta\theta_k$. According to the non-patent literature 1, all of such phase rotation applied subcarriers are added, and outputs of the subcarrier modulating units and the phase rotating units for all information bits are further added in an adder 1053. A receiving device multiplies a complex conjugate of phase rotation given in a transmitting device, thereby compensating the phase rotation and restoring information data. The non-patent literature 1 discloses that it is possible to improve receiving features and ensure a high transmission rate by such configuration, compared to general OFDM.

[Non Patent Literature 1] D. A. Wiegandt, Z. Wu, C. R. Nassar, "High-throughput, high-performance OFDM via pseudo-orthogonal carrier interferometry spreading codes", IEEE Transactions on Communications, vol. 51, no. 7, July 2003, pp. 1123-1134.

If a plurality of antennas simultaneously transmit different multicarrier signals, or if a terminal being positioned around a cell edge receives downlink transmission in an OFDM cellular system in which adjacent cells use an identical frequency band, a plurality of different multicarrier signals are mixed in a receiving side, so that the respective signals interfere with each other. In such a case, it is very difficult to identify which antenna has transmitted a received signal or which base station has transmitted the signal. Because of this, there has been a problem in that the accuracy of estimation of a channel response deteriorates significantly.

It is an object of the present invention to improve the accuracy of estimation of channel responses in receiving signals from a plurality of antennas.

DISCLOSURE OF THE INVENTION

With radio communication techniques according to the present invention, symbols transmitted simultaneously from a plurality of antennas are given different phase rotation for the antennas, whereby a receiving side separates and calculates delay profiles of the signals transmitted from the antennas. That is, by transmitting preambles to which different phase rotation has been applied for a plurality of antennas or cells, a receiving side separates a delay profile of a signal coming from each antenna or each cell to identify a transmitting antenna or a transmitting base station and to estimate a channel response. If the number of delay profiles to be separated is large, different preamble patterns are used together, realizing highly accurate separation of a delay profile.

Particularly, the techniques can be applied to a case that a transmitting device comprises a plurality of antennas, enabling selection of a transmitting antenna in transmit diversity. Additionally, the number of transmitting antennas in a MIMO (Multi Input Multi Output) system can be decided.

Furthermore, the techniques can be applied to reception of signals from a plurality of transmitting devices. In that case, they can be used to identify a base station in reception of signals from a plurality of base stations. Further, delay profile separating by time shift and a code can be used together. That is, the identification of a base station can use a code, while identification of a plurality of antennas in the base station can use time shift.

The use of the present invention enables to separate and identify OFDM signals transmitted simultaneously from a plurality of base stations and estimate a channel response of a desired signal with high accuracy. It also enables to detect a signal of a base station to connect to at the start of communication and at handover with high accuracy. It further makes performing site diversity easy by transmitting identical data from a plurality of adjacent base stations, improving receiving features of a terminal being positioned around a cell boundary. If each base station comprises a plurality of transmitting antennas, a sequence of signal specific to the base station as a signal to estimate a channel response is used. Then, by giving phase rotation differing among transmitting antennas to the signal to estimate a channel response and by transmitting the signal, a channel response of a desired signal can be estimated with high accuracy even in the environment in which many signals are to be separated.

Furthermore, the use of the present invention enables to select an appropriate transmitting antenna or the number of transmitting antennas depending on the status of a channel response when a transmitting device comprising a plurality of transmitting antennas conducts selective transmit diversity transmission or MIMO transmission.

BRIEF DESCRIPTION OF THE DRAWINGS

FIG. 4(a) is a diagram showing a delay profile obtained in a receiving side when no phase rotation is applied to preambles transmitted from transmitting antennas X and Y. FIG. 4(b) is a diagram showing a delay profile when phase rotation is applied to a preamble transmitted from the transmitting antenna Y;

DESCRIPTION OF SYMBOLS

Figure 1:
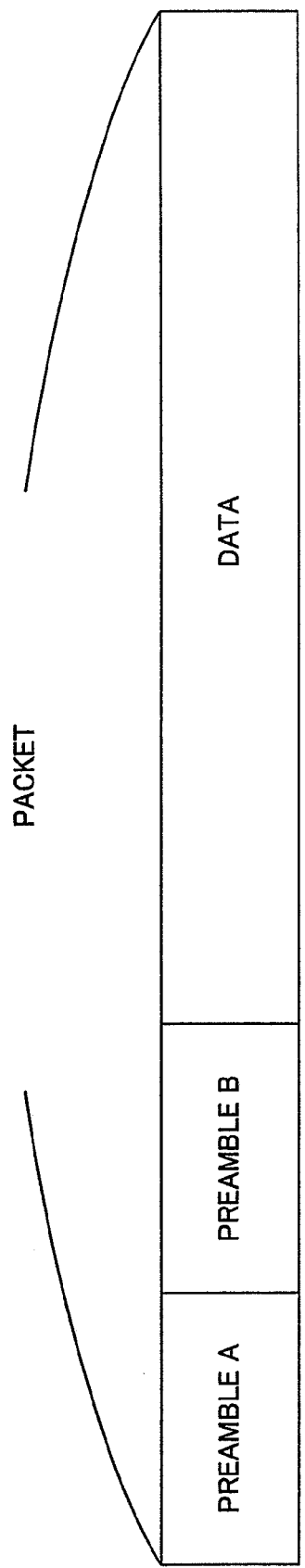
FIG. 1 is a diagram showing an example of a packet format being a target of radio communication techniques according to embodiments of the present invention.

010 . . . preamble A generating unit; 011 . . . preamble B generating unit; 012, 013 . . . phase rotating units; 014, 015 . . . multiplexing units; 016 . . . forward error correction coding unit; 017 . . . S/P converting unit; 018 . . . mapping unit; 019 . . . changeover switch; 020, 026 . . . IDFT units; 021, 027 . . . P/S converting units; 022, 028 . . . GI (Guard Interval) inserting units; 023, 029 . . . D/A converting units; 024, 030 . . . radio transmitting units; 025, 031 . . . antenna units; 040 . . . antenna unit; 041 . . . radio receiving unit; 042 . . . A/D converting unit; 043 . . . synchronizing unit; 044 . . . GI removing unit; 045 . . . S/P converting unit; 046, 052 DFT units; 047 . . . changeover switch; 048 . . . preamble multiplying unit; 049 . . . IDFT unit; 050 . . . delay profile power measuring unit; 051 . . . time filter; 053 . . . channel response compensation and demapping unit; 054 . . . P/S converting unit; 055 . . . forward error correction decoding unit.

BEST MODE FOR CARRYING OUT THE INVENTION

The present invention is characterized by using a nature that a signal in a time domain can be time-shifted by giving continuous phase rotation to each subcarrier used for multicarrier transmission, to apply a technique to separate multicarrier signals received via propagation paths transmitted simultaneously from a plurality of antennas and differing among the respective antennas to identification of antennas or base stations. More specifically, the present invention realizes the above processing by fixing a phase difference among subcarriers with the same consecutive preambles, by giving phase rotation of Inn (m being an integer not less than 1) for all subcarriers and by time-shifting a signal for each antenna.

A time-shifted preamble can characteristically serve to estimate channel responses from antennas using the same code with the same extent of accuracy as using different codes. Therefore, shortage of codes can be solved. Further, a single OFDM symbol is sufficient to estimate channel responses from a plurality of antennas, thereby preventing decrease of throughput.

Next, relation between phase rotation given to each subcarrier and time shift of a signal will be briefly described.

First, a time domain signal is represented by s(t) and a signal obtained by converting s(t) into a frequency domain one is represented by S(f). The s(t) and S(f) form a Fourier transform pair and have the relation in the equation (6):

Equation 4

$$s(t) \leftrightarrow S(f) \qquad (6)$$

wherein a time shift relation exists that is represented by the equation (7):

Equation 5

$$s(t-\tau) \leftrightarrow S(f)e^{-j2\pi f\tau} \qquad (7)$$

As shown in the equation (7), continuous phase rotation in adjacent subcarriers is given (the right side of the equation (7)), whereby a time domain signal can be time-shifted. Consequently, for example if such phase rotation is applied to a signal (an impulse signal in a time domain) obtained by setting amplitudes and phases of all subcarriers to equal values, the impulse position can be controlled.

In the following, a system using an OFDM signal being one kind of a multicarrier signal will be described. Such an OFDM system uses 64 subcarriers herein.

A packet format for the radio communication techniques according to the embodiments of the present invention is the same as shown FIG. 1 herein. As described previously, a packet shown in FIG. 1 includes a preamble A, a preamble B and data. A preamble A is used for OFDM symbol synchronization and frequency synchronization, while a preamble B is used for identification of an antenna and estimation of a channel response. The two preambles are both predetermined signals.

In the following, the embodiments of the present invention will be described in detail. In the radio communication techniques according to the following embodiments, discrete Fourier transform and inverse discrete Fourier transform are mainly used as means for performing Fourier transform and inverse Fourier transform on a digital signal, while fast Fourier transform and inverse fast Fourier transform can also be used. Further, when a transmitting side uses inverse discrete Fourier transform and a receiving side uses fast Fourier transform, or when a transmitting side uses inverse fast Fourier transform and a receiving side uses discrete Fourier transform, an antenna or a base station can be identified by giving phase rotation adjusted by considering the number of subcarriers in use and the number of points used for fast Fourier transform.

First, a radio communication technique according to a first embodiment of the present invention will be described with reference to the drawings.

The radio communication technique according to the first embodiment of the present invention is directed to downlink transmission, in which a transmitting (base station) side comprises a plurality of antennas, and relates to an antenna selection manner for performing transmitting antenna selection diversity. According to this embodiment, a plurality of antennas simultaneously transmit OFDM signals, and a receiving side separates the signals transmitted from the respective antennas and estimates which antenna has transmitted a received signal having the highest power.

Figure 2:
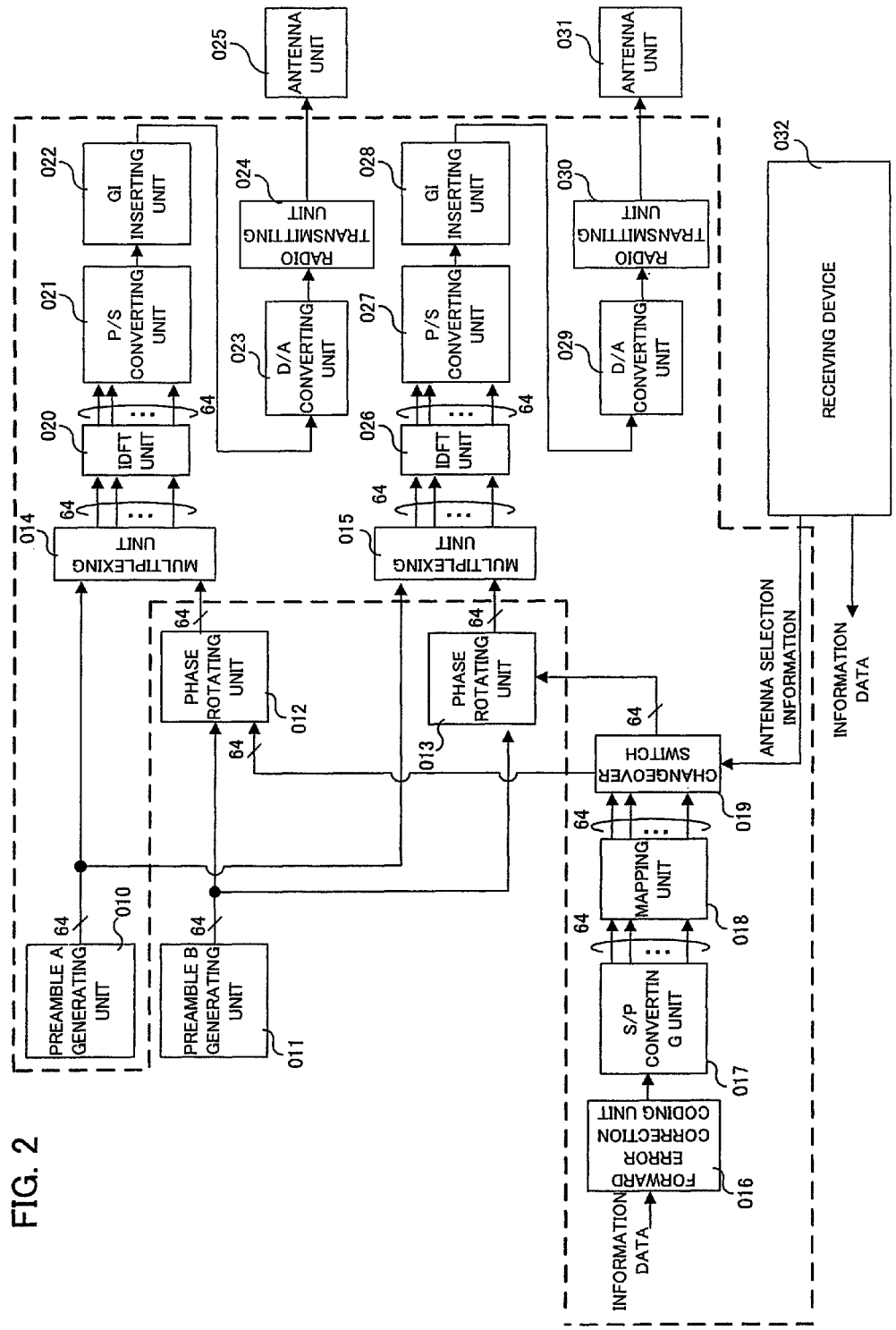
FIG. 2 is a diagram showing a configuration example of a transmitting device of a base station among radio communication devices according to a first embodiment of the present invention.

FIG. 2 is a diagram showing a configuration example of a transmitting device of a base station among radio communication devices according to the first embodiment of the present invention. However, an example is described in which the transmitting device comprises two transmitting antennas in FIG. 2. As shown in FIG. 2, the transmitting device of the base station according to this embodiment includes a preamble A generating unit 010, a preamble B generating unit 011, phase rotating units 012 and 013, multiplexing units 014 and 015, an forward error correction coding unit 016, an S/P converting unit 017, a mapping unit 018, a changeover switch 019, IDFT (or IFFT) units 020 and 026, P/S converting units 021 and 027, GI (Guard Interval) inserting units 022 and 028, D/A converting units 023 and 029, radio transmitting units 024 and 030, and antenna units 025 and 031.

In the configuration shown in FIG. 2, the preamble A generating unit 010 and the preamble B generating unit 011 generate the preamble A and the preamble B (see the packet format in FIG. 1), respectively. The preamble A is outputted to the multiplexing units 014 and 015, while the preamble B is outputted to the phase rotating units 012 and 013. The phase rotating units 012 and 013, to which the preamble B has been inputted, give continuous phase rotation to subcarriers of the preamble B. In the transmitting device of the base station according to this embodiment, the phase rotating unit 012 does not give phase rotation, but only the phase rotating unit 013 gives phase rotation to the preamble B. In this way, phase rotation is given only to the second preamble in a packet transmitted from one antenna of preambles transmitted from the two antennas that the transmitting device of the base station comprises, while phase rotation is not given to the other preambles. Information data is encoded in the forward error correction coding unit 016, goes through the S/P converting unit 017 and is mapped depending on a modulation scheme in the mapping unit 018.

An information signal generated in the above way is given phase rotation similarly to the preamble B, and then time-multiplexed with the preamble for transmission. The information signal is transmitted from only an antenna determined to obtain high received power by reflecting a result of transmitting antenna selection in the previous packet. For this purpose, a terminal feeds back the result of transmitting antenna selection to the base station. The antenna selection information received in a receiving device 032 of the base station is transmitted to the changeover switch 019, which performs switching such that an information signal is transmitted only from a selected transmitting antenna. However, an information signal is transmitted from any one predetermined antenna at the start of communication. In the following description, the antenna unit 025 is selected for example.

An antenna for transmitting an information signal is selected as described above, the changeover switch 019 controls the information signal to be inputted only to the phase rotating unit 012, and the phase rotating unit 012 gives phase rotation similar to the phase rotation given to the preamble B to the information signal (however, as described above, the amount of phase rotation given in the phase rotating unit 012 is zero in this embodiment). An information signal given phase rotation as described above is time-multiplexed with a preamble in the multiplexing unit 014, and then a guard interval is attached for each OFDM symbol in the GI inserting units 022 and 028. At that time, the GI inserting unit 022 processes a packet formed by the preambles A and B and an information signal, while the GI inserting unit 028 processes a packet formed by only the preambles A and B. After the guard interval is attached, the antenna unit 025 transmits the packet formed by the preambles A and B and the information signal at the same time as the antenna unit 031 transmits the packet formed by the preambles A and B, in which both the transmissions are performed through the D/A converting units 023 and 029 and the radio transmitting units 024 and 030 provided for each transmitting antenna.

Figure 3:
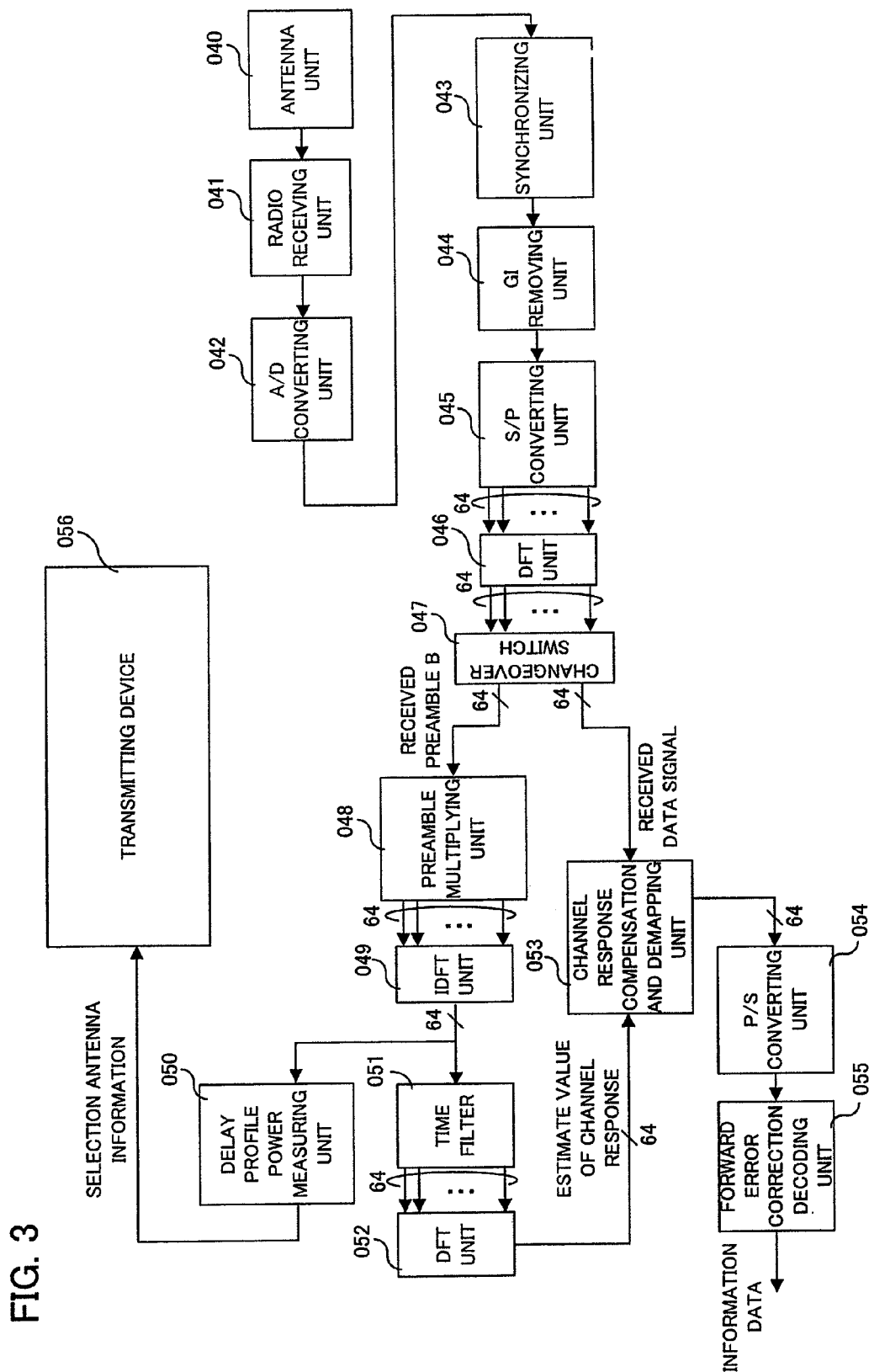
FIG. 3 is a diagram showing a configuration example of a receiving device of a terminal according to the first embodiment of the present invention.

Next, a configuration example of a receiving device of a terminal according to this embodiment will be described with reference to FIG. 3. As shown in FIG. 3, the receiver of the terminal according to this embodiment includes an antenna unit 040, a radio receiving unit 041, an A/D converting unit 042, a synchronizing unit 043, a GI removing unit 044, an S/P converting unit 045, DFT (or FFT) units 046 and 052, a changeover switch 047, a preamble multiplying unit 048, an IDFT (or IFFT) unit 049, a delay profile power measuring unit 050, a time filter 051, a channel response compensation and demapping unit 053, a P/S converting unit 054 and an forward error correction decoding unit 055.

As described above, a transmitting device of a base station simultaneously transmits a packet consisting of preambles A and B and an information signal and a packet consisting of preambles A and B from different antennas. On the other hand, in a receiving device of the terminal, these packets are simultaneously received by the single antenna 040 via different propagation paths.

The received signal added with the two packets via the different propagation paths as above is inputted to the synchronizing unit 043 via the radio receiving unit 041 and the A/D converting unit 042. In the synchronizing unit 043, symbol synchronization is established by using the preamble A, thereby subsequent processing is performed at appropriate time.

Figure 4:
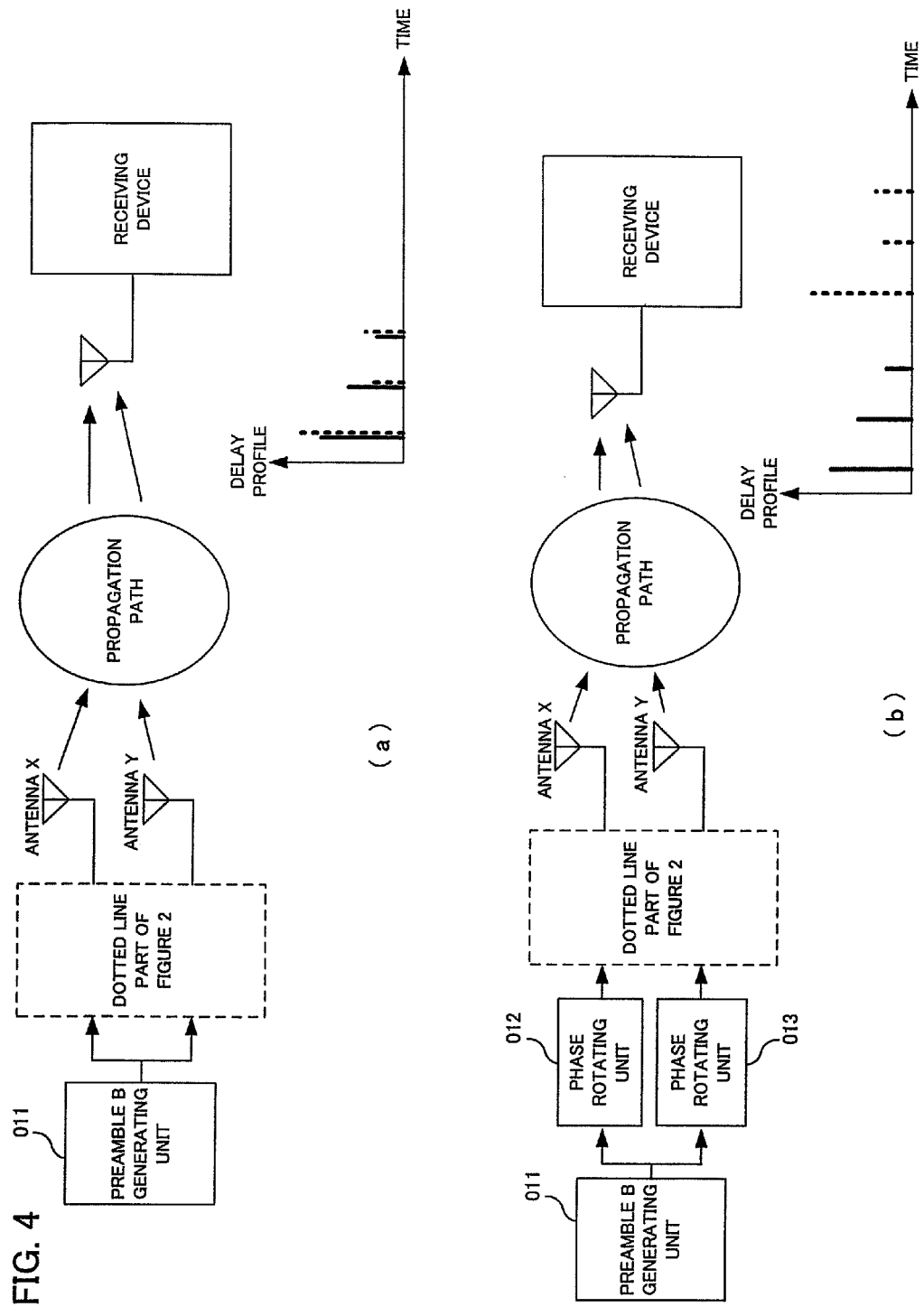
FIG. 4 is a diagram showing examples of delay profiles obtained by the radio communication technique according to the first embodiment of the present invention.

Next, the GI removing unit 044 removes the guard interval attached in the transmitting side, and then the S/P converting unit 045 converts a serial signal into a parallel signal and inputs the result to the DFT unit 046. Then, the DFT unit 046 converts the received time domain signal into a frequency domain signal and transmits the result to the changeover switch 047. The changeover switch 047 controls switching such that the preamble B is transmitted to the preamble multiplying unit 048 and the information signal is transmitted to the channel response compensation and demapping unit 053. Next, the preamble multiplying unit 048 multiplies a value obtained by normalizing a complex conjugate of the preamble B used in the transmitting side by a squared amplitude of the preamble B, and the received preamble B. The received preamble B indicates a signal added with two preambles B that have been transmitted from the two transmitting antennas and have arrived via different propagation paths. The multiplication result is converted into a time domain signal in the IDFT unit 049 to obtain delay profiles of propagation paths through which signals have been transmitted from the antenna unit 021 and the antenna unit 029 of the transmitting device of the base station. A delay profile obtained herein means an impulse response of a propagation path. FIG. 4 shows examples of delay profiles obtained as above. FIG. 4(*a*) is a diagram showing a delay profile obtained in a receiving side when no phase rotation is applied to preambles transmitted from transmitting antennas X and Y. FIG. 4(*b*) is a diagram showing a delay profile when phase rotation is applied to a preamble transmitted from the transmitting antenna Y. Detailed configuration of the transmitting device and the receiving device is omitted in FIG. 4 for simplicity. FIG. 4 is a drawing showing a configuration example in which the receiving device has configuration similar to FIG. 3, while the transmitting device does not include a phase rotating unit as in FIG. 4(*a*) or does include the phase rotating unit as in FIG. 4(*b*). Other configuration in FIG. 4 is similar to the configuration shown in FIG. 2.

First, as shown in FIG. 4(*a*), if identical preambles generated by the preamble B generating unit 011 are simultaneously transmitted from the two antennas X and Y of the transmitting device of the base station shown in the dotted line part in FIG. 2 via propagation paths to the receiving device, then delay profiles obtained after IDFT (the IDFT unit 049 in FIG. 3) in the receiving device are responses added with delay profiles of the propagation paths through which the signals transmitted from the two antennas have been transmitted. As such, in that case, the delay profiles of the propagation paths through which the signals transmitted from the two antennas X and Y have been transmitted cannot be separated for seeking. That is, as can be seen from the relation between a delay profile and time, the delay profile of the signal transmitted from the antenna X shown by solid lines and the delay profile of the signal transmitted from the antenna Y shown by dotted lines are observed as a composition at a receiving side, so that they cannot be separated.

On the other hand, as shown in FIG. 4(*b*), if phase rotation is given to subcarriers of the preamble B generating unit 011 (however, the amount of phase rotation is herein zero in the unit 012 of the phase rotating units 012 and 013), then different time shifts are applied to the signal transmitted from the antenna X and the signal transmitted from the antenna Y according to a principle shown in the equation (7). Because of this, at the receiving side, the delay profile of the signal transmitted from the antenna X shown by the solid lines and the delay profile of the signal transmitted from the antenna Y shown by the dotted lines are observed as two delay profiles being separated in time in the receiving side. In this way, different phase rotation is previously given to a signal transmitted from two antennas at the transmitting side, and the receiving side performs appropriate time filtering (time filtering to decide time or a sample point to start the filtering depending on the amount of phase rotation given at the transmitting side), thereby a delay profile observed at the receiving side can be easily separated, as can be seen.

With the radio communication technique according to this embodiment, as described above, a separated delay profile is inputted to the delay profile power measuring unit 050 shown in FIG. 3, and a transmitting antenna is selected that is observed to have high power of a first-path electric wave. For this purpose, selection antenna information that a transmitting antenna is selected that is observed to have high power of a first-path electric wave in the delay profile power measuring unit 050 is inputted to a transmitting device 056 and fed back to the base station. The selection result is to be reflected in the next downlink transmission.

A term "first-path electric wave" is herein used in the following meaning. That is, usually in a radio communication environment, an electric wave arrives at a receiver via various routes, so that different route lengths cause difference of arrival time of the electric wave. In such a multipath environment, an expression "path" generally refers to an electric wave (a composite wave of a plurality of electric waves) that arrives at a certain time, while a "first-path electric wave" means an electric wave that first arrives.

The delay profile obtained in the IDFT unit 049 is inputted to the time filter 051 and unnecessary portions are removed from the profile. An information signal following the preamble B is transmitted only from one of the antennas (for example, the antenna unit 021) of the transmitting side. Because of this, in order to compensate a channel response of an information signal, it is required to obtain only channel response between an antenna that has transmitted the information signal and the receiving antenna. Based on this, the time filter 051 (FIG. 2) is configured to pass through only a delay profile obtained from the preamble B transmitted from the same antenna as the information signal, and time or a sample point to start filtering is decided depending on the amount of phase rotation (the amount of time shift) given at the transmitting side, as described previously. In this embodiment, since the antenna unit 025 has been selected, the amount of phase rotation given at the transmitting side is zero, and a reference sample point to start filtering is also zero. On the contrary, filtering when the antenna unit 031 is selected is started from a reference sample point near to applied time shift, while zero is inserted to samples before the reference sample point. An output of the time filter 051 is inputted to the DFT unit 052, obtaining an estimation value of channel response required to demodulate the information signal. Next, the obtained estimation value of channel response and a received information signal are inputted to the channel response compensation and demapping unit 053, which compensates the channel response and demaps the received information signal. Then, the signal goes through the P/S converting unit 054 to the forward error correction decoding unit 055 which performs decoding, reproducing information data.

Using the above described transmitting device and receiving device, it is possible to separate delay profiles of received signals being OFDM signals transmitted simultaneously from different antennas that have arrived via different propagation paths, and a single symbol is sufficient to precisely estimate channel response and select a transmitting antenna in performing transmit diversity. However, with the radio communication technique according to this embodiment, a transmitting antenna is selected that has power of a first-path electric wave of a delay profile measured to be high; instead, configuration can also possible in which power of all paths is summed up to select a transmitting antenna having the highest sum total value.

Next, a radio communication technique according to a second embodiment of the present invention will be described with reference to the drawings. With the above described radio communication technique according to the first embodiment of the present invention, continuous phase rotation is given to subcarriers used for multicarrier transmission, thereby enabling to time-shift a time domain signal. Using this feature, the technique serves to separate multicarrier signals transmitted simultaneously from a plurality of antennas and received via propagation paths differing among respective antennas. A related technique includes a MIMO (Multi Input Multi Output) system as a system in which a plurality of antennas are used in not only a transmitting side but also a receiving side. The radio communication technique according to the second embodiment of the present invention is directed to a MIMO system and particularly relates to an approach to decide the number of transmitting antennas used in MIMO transmission depending on the status of a channel response.

Figure 9:
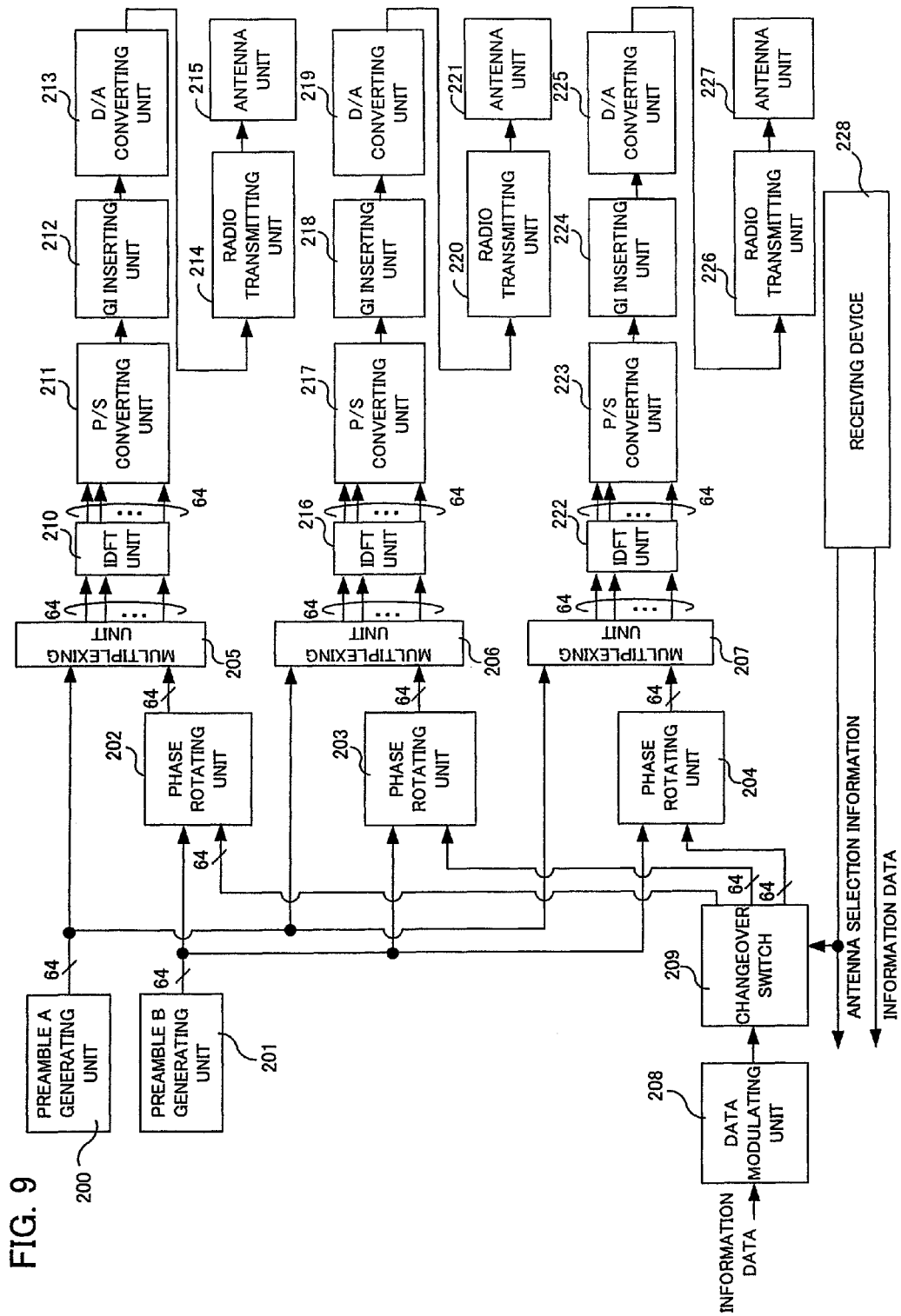
FIG. 9 is a diagram showing a configuration example of a transmitting device according to a second embodiment of the present invention.

First, a configuration example of a transmitting device according to the second embodiment of the present invention is shown in FIG. 9. FIG. 9 is a diagram showing a configuration example of a transmitting device including three transmitting antennas. As shown in FIG. 9, the transmitting device according to this embodiment includes a preamble A generating unit 200, a preamble B generating unit 201, phase rotating units 202, 203 and 204, multiplexing units 205, 206 and 207, a data modulating unit 208, a changeover switch 209, IDFT units 210, 216 and 222, P/S converting units 211, 217 and 223, GI inserting units 212, 218 and 224, D/A converting units 213, 219 and 225, radio transmitting units 214, 220 and 226, and antenna units 215, 221 and 227. As shown in FIG. 9, the transmitting device according to this embodiment is configured to select to perform signal processing on the two preamble generating units 200 and 201 and output signals from the preamble generating units 200 and 201 directly or through the phase rotating units.

An example of basic data transmission processing in the transmitting device shown in FIG. 9 will be described below. In order to start the transmission processing when information data to be transmitted is generated, first, different streams used as the information data are generated by the number of antennas, and the data modulating unit 208 performs forward error correcting coding or modulation on each data stream. In MIMO transmission to transmit data streams differing among the antennas, for example if all of the three antennas are used, triple transmission capacity can be obtained compared to transmission using a single antenna. After the modulation in the data modulating unit 208, the changeover switch 209 allocates each stream to the type of an antenna to which the stream is transmitted. Then, the phase rotating units 202, 203 and 204 of the types give phase rotation to each stream by the same amount as that of rotation (the amount of phase rotation differing among the antenna types) given to the preamble B, and the multiplexing units 205, 206 and 207 time-multiplex the stream with the preamble A and the preamble B. Afterward, the GI inserting unit attaches a guard interval to a signal subjected to IDFT and P/S conversion in the types of antennas. After D/A conversion is further performed on the signal and the radio transmitting unit performs frequency conversion on the signal into a radio frequency band, the antenna unit transmits respective signal streams.

Figure 10:
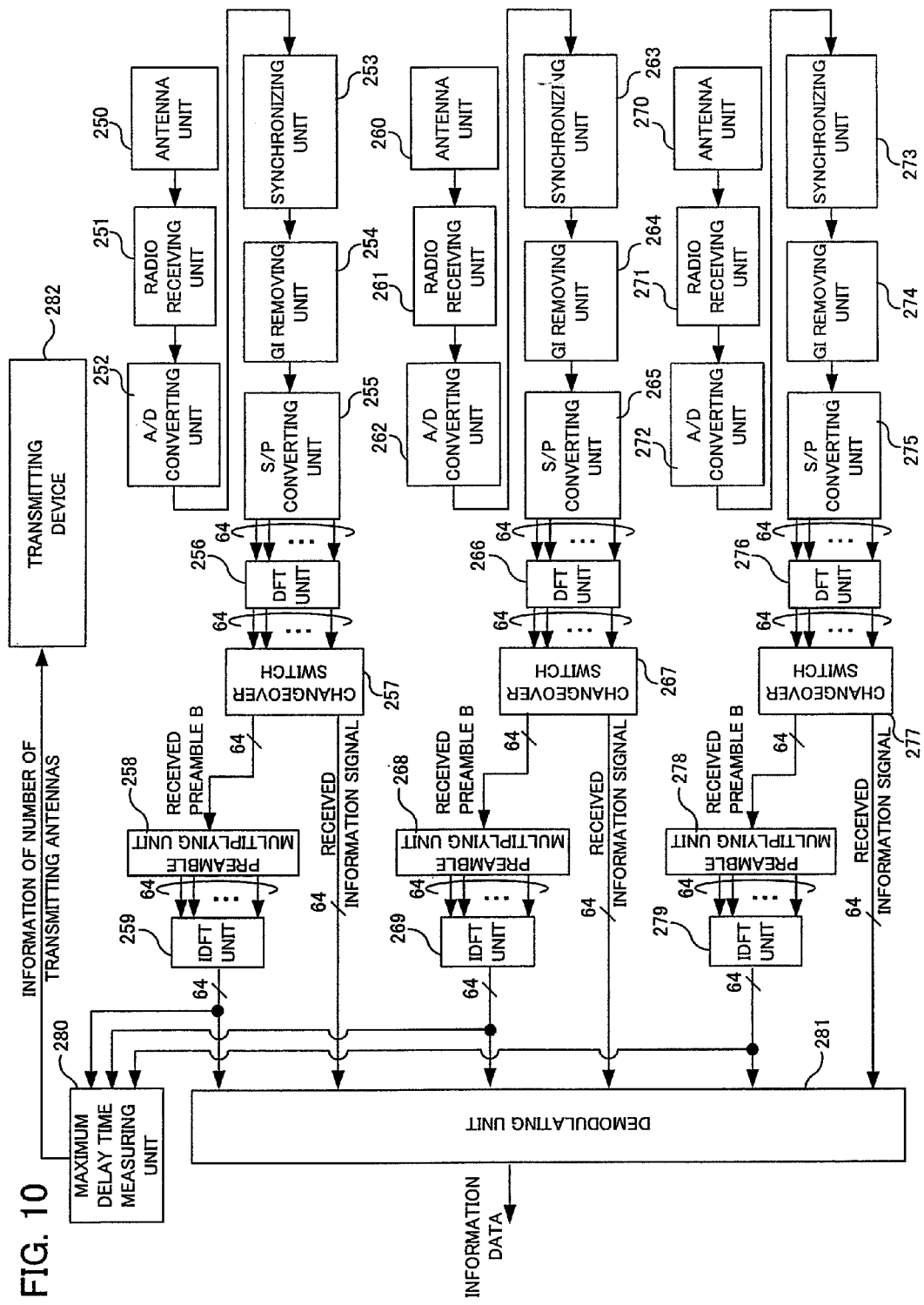
FIG. 10 is a diagram showing a configuration example of a receiving device according to the second embodiment of the present invention.

FIG. 10 is a diagram showing a configuration example of a receiving device used in the radio communication technique according to this embodiment. However, FIG. 10 is a diagram showing an example that includes three receiving antennas. As shown in FIG. 10, the receiving device according to this embodiment includes antenna units 250, 260 and 270, radio receiving units 251, 261 and 271, A/D converting units 252, 262 and 272, synchronizing units 253, 263 and 273, GI removing units 254, 264 and 274, S/P converting units 255, 265 and 275, DFT units 256, 266 and 276, changeover switches 257, 267 and 277, preamble multiplying units 258, 268 and 278, IDFT units 259, 269 and 279, a maximum delay time measuring unit 280 and a demodulating unit 281.

An example of basic data demodulation processing in the transmitting device shown in FIG. 10 will be described below. The antenna units 250, 260 and 270 shown in FIG. 10 receive signals transmitted from a plurality of antennas included in the transmitting device via propagation paths. For example, when the three antennas in the transmitting device transmit different information signal streams, the antenna unit 250 shown in FIG. 10 receives signals in which the three information signal streams through different propagation paths are mixed. Similarly, the antenna units 260 and 270 also receive signals in which three information signal streams through different propagation paths are mixed. On such a received signal, the radio receiving units 251, 261 and 271 perform frequency conversion into a frequency band on which A/D conversion is possible, the A/D converting units 252, 262 and 272 perform A/D conversion, and then the synchronizing units 253, 263 and 273 establish OFDM symbol synchronization. The synchronization processing in the synchronizing units 253, 263 and 273 is performed using the preamble A. Afterward, the GI removing units 254, 264 and 274 removes a guard interval, the S/P converting units 255, 265 and 275 perform S/P conversion, and then the DFT units 256, 266 and 276 convert a received time domain signal into a frequency domain one. Then, the changeover switches 257, 267 and 277 controls the preamble B to be transmitted to the preamble multiplying units 258, 268 and 278, and controls the received information signal to be transmitted to the demodulating unit 281.

The preamble multiplying units 258, 268 and 278 multiply a value obtained by normalizing a complex conjugate of the preamble B used in the transmitting side by a squared amplitude of the preamble B and the received preamble B. When the multiplication result is inputted to the respective IDFT units 259, 269 and 279, as described with connection to the embodiments, delay profiles of propagation paths through which signals have been transmitted from the transmitting antennas are obtained in a state being separated for each transmitting antenna. This is because the transmitting side gives phase rotation differing among the antennas to the preambles, so a time signal time-shifts for each antenna for the relation in the equation (7). In this way, channel response can be compensated for each information signal stream according to a delay profile separated for each transmitting antenna. This enables to demodulate information data in the demodulating unit 281 by realizing the configuration in which outputs of the IDFT units 259, 269 and 279 and information signals received by the receiving antennas are inputted to the demodulating unit 281.

Figure 11:
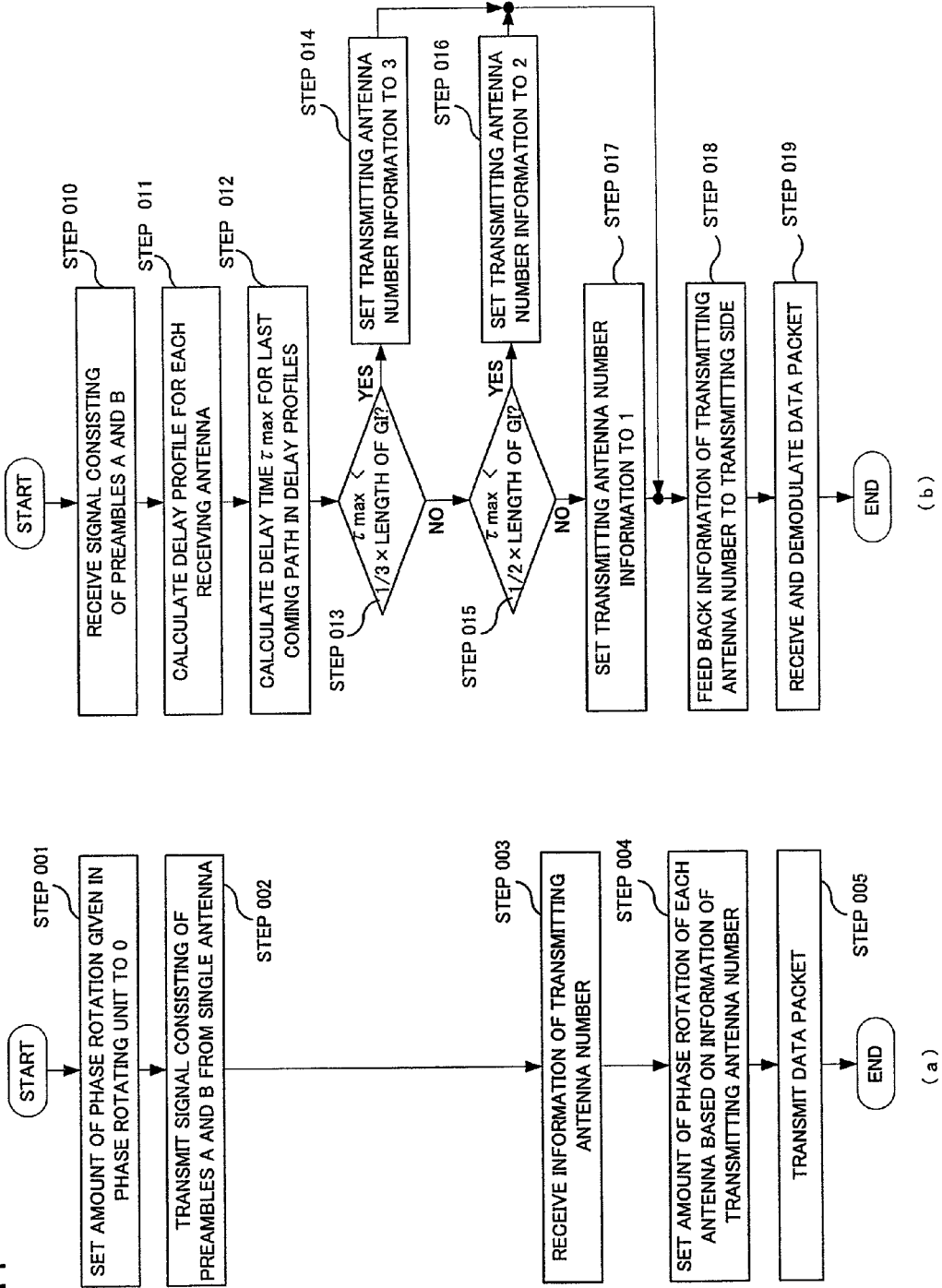
FIG. 11 is a diagram showing the flow of transmission and reception processing according to the second embodiment of the present invention.
Figure 12:
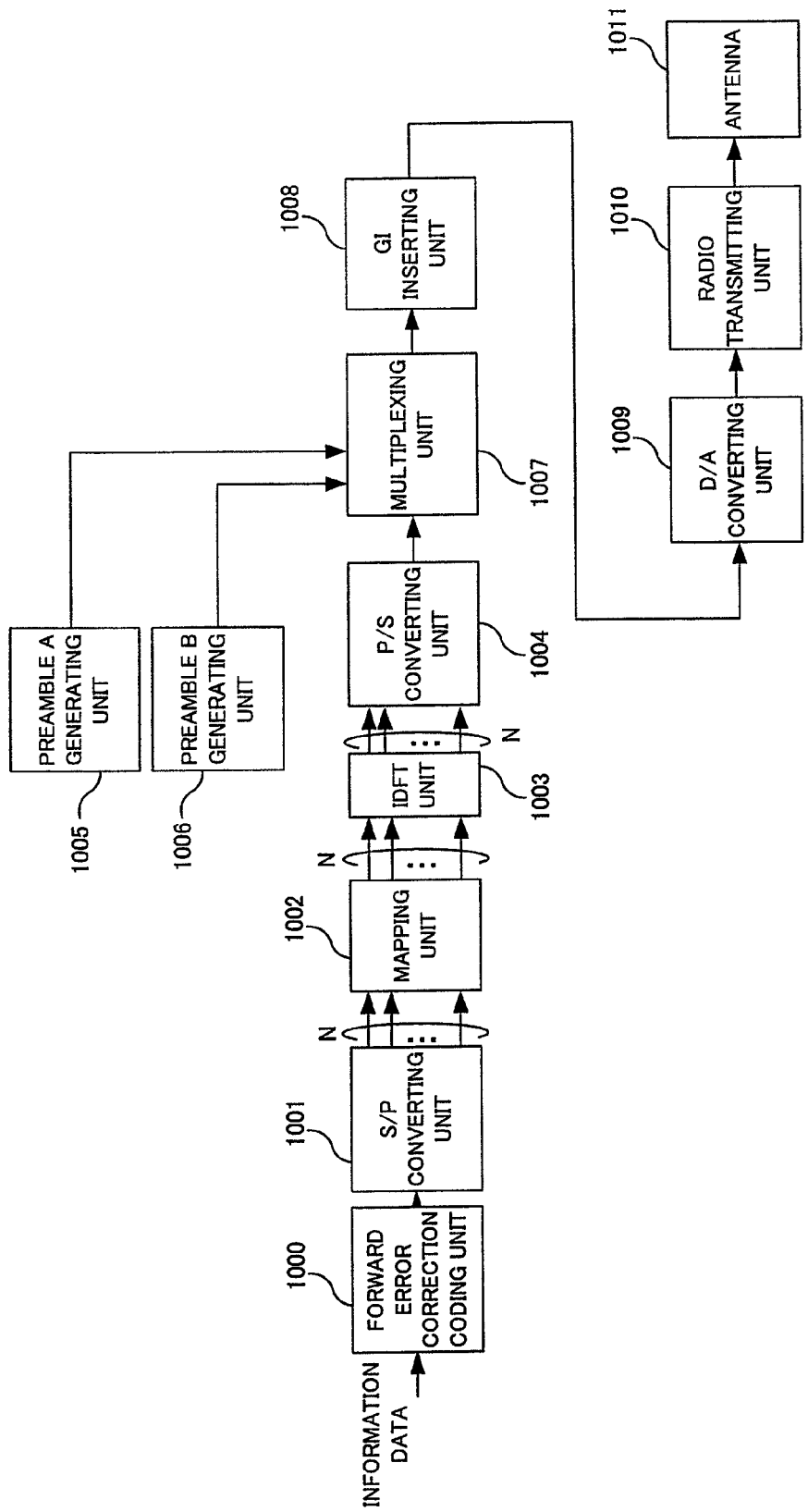
FIG. 12 is a functional block diagram showing a configuration example of a usual OFDM modulation circuit.
Figure 13:
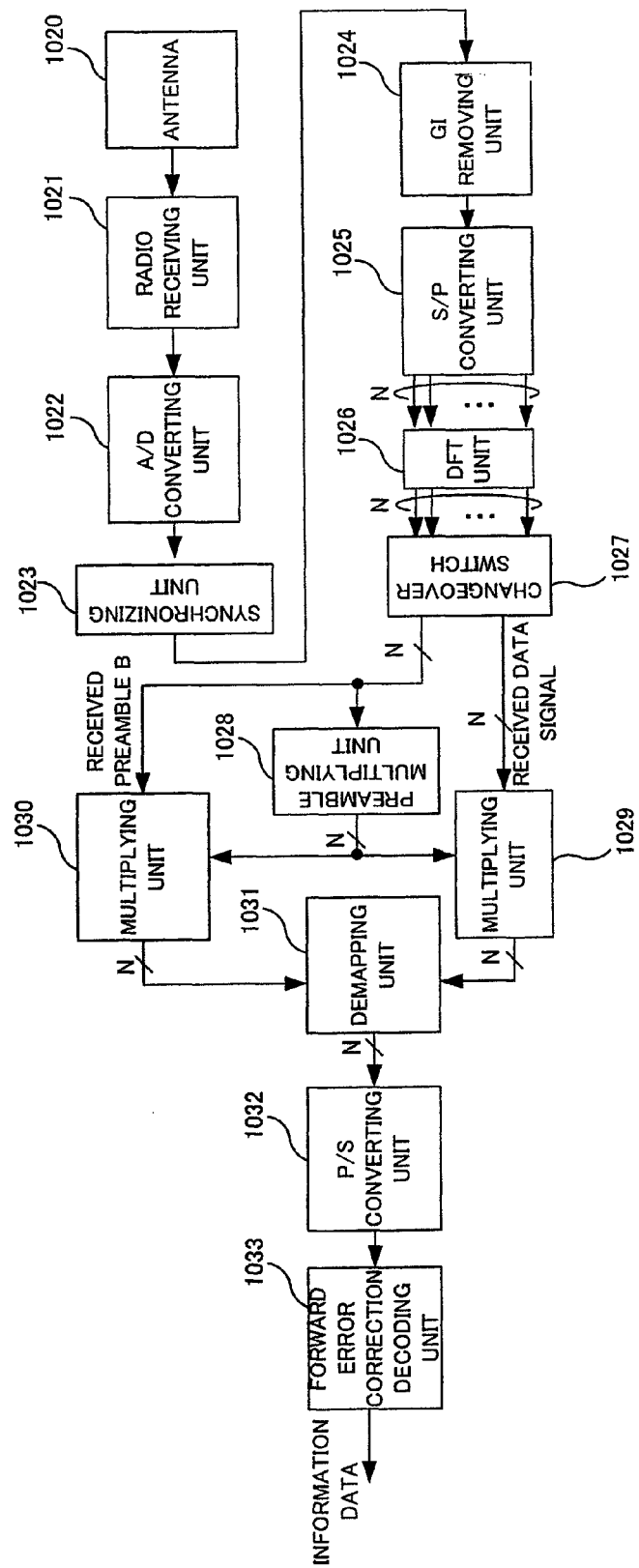
FIG. 13 is a functional block diagram showing a configuration example of a usual OFDM demodulating circuit.
Figure 14:
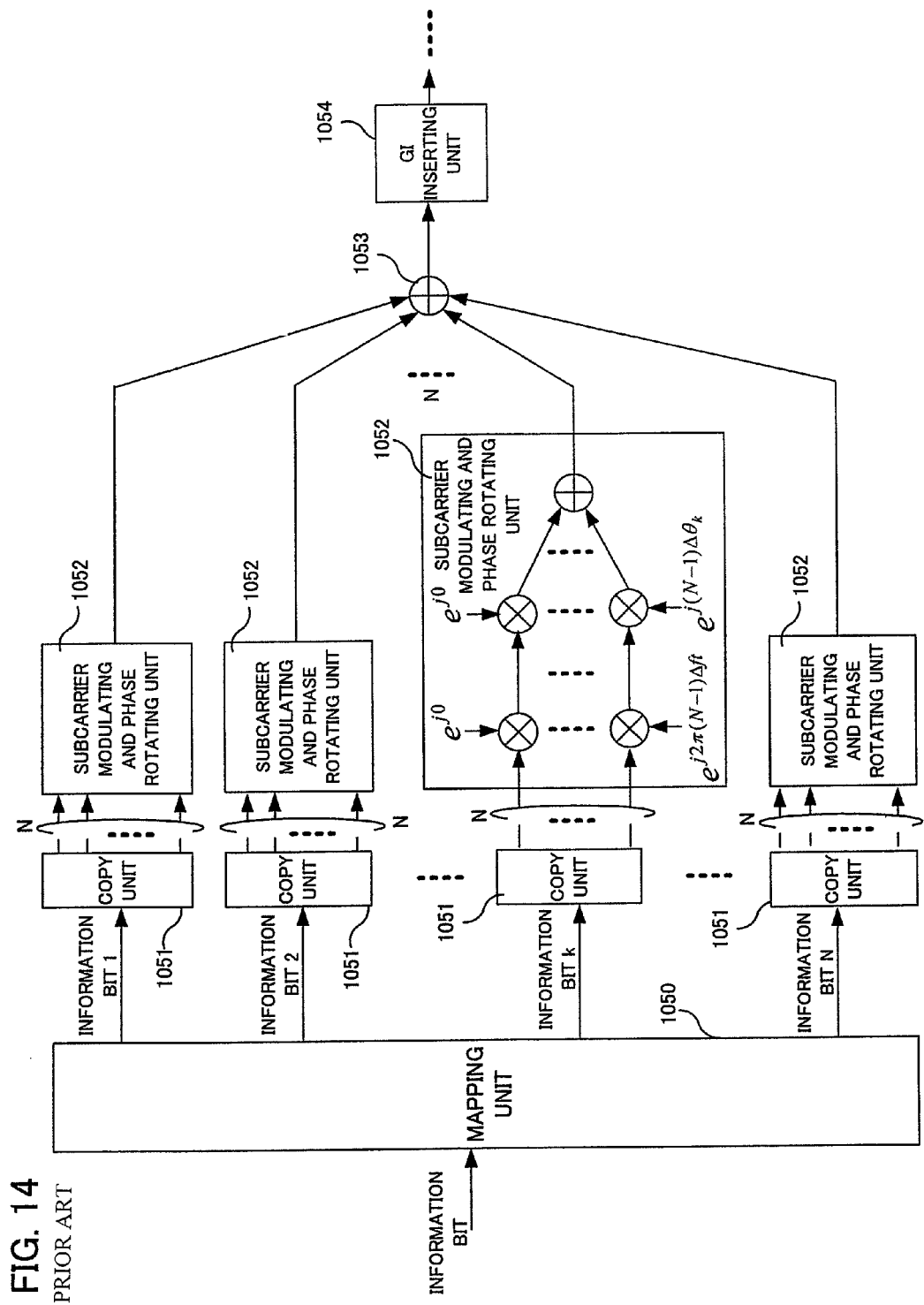
FIG. 14 is a functional block diagram showing a configuration example of a transmitting device disclosed in the non-patent literature 1.

FIG. 11 is a flowchart showing the flow of the control to change the number of antennas for transmitting an information signal stream depending on the status of a channel response in the transmitting/receiving devices of a MIMO system including the above described configuration. First, the flow of the control by the transmitting side will be described. As shown in FIG. 11 (a; the left side of the drawing), the transmitting device according to this embodiment first sets the amount of phase rotating given in the phase rotating unit to zero (without phase rotation) prior to transmission of a data packet, and transmits a signal consisting of preambles A and B from a single antenna (steps 001 to 002).

Then, as shown at step 003, the receiving device receives the information of the number of transmitting antennas fed back from the receiving side. Next, based on the information of the number of transmitting antennas received at step 003, the amount of phase rotation given to preambles B and information signals transmitted from the antennas is set to values differing among the antennas (step 004), data packets are transmitted using the number of antennas notified in the information of the number of transmitting antennas. However, as described above, information signal streams differing among the antennas are transmitted.

Next, the flow of control processing by the receiving side will be described. As shown in FIG. 11(*b*), the receiving device according to this embodiment receives only a signal consisting of a preamble A and a preamble B transmitted from the transmitting side using, for example, three receiving antennas (step 010), performs processing similar to the previously described demodulating procedure, and each of the IDFT units 259, 269 and 279 calculates a delay profile (step 011). Next, the calculated delay profile is transmitted to the maximum delay time measuring unit 280 shown in FIG. 10, and a delay time τmax of a path having the longest delay time (that arrives last) in all delay profiles is calculated (step 012). Then, as shown at steps 013 and 015, it is determined how the τmax accounts for the length of a GI (guard interval).

At step 013, τmax is compared with GI length*⅓. If it is determined that τmax is smaller (Yes), the processing proceeds to step 014. If it is determined that τmax is larger (No), the processing proceeds to step 015. If it is determined that τmax is smaller at step 013, the amount of phase rotation given to the preambles B transmitted from the three transmitting antennas is set as follows: for example, the phase rotating unit 202 sets the amount to 0; the phase rotating unit 203 sets the amount to the phase rotation amount in which the amount of time shift is GI length*⅓; and the phase rotating unit 204 sets the amount to the amount of phase rotation in which the time shift amount is GI length*⅔. By this setting, the delay profiles can be separated without interfering to one another in the receiving side. Consequently, in this processing, information of the number of transmitting antennas is set to 3 as shown at step 014.

Figure 8:
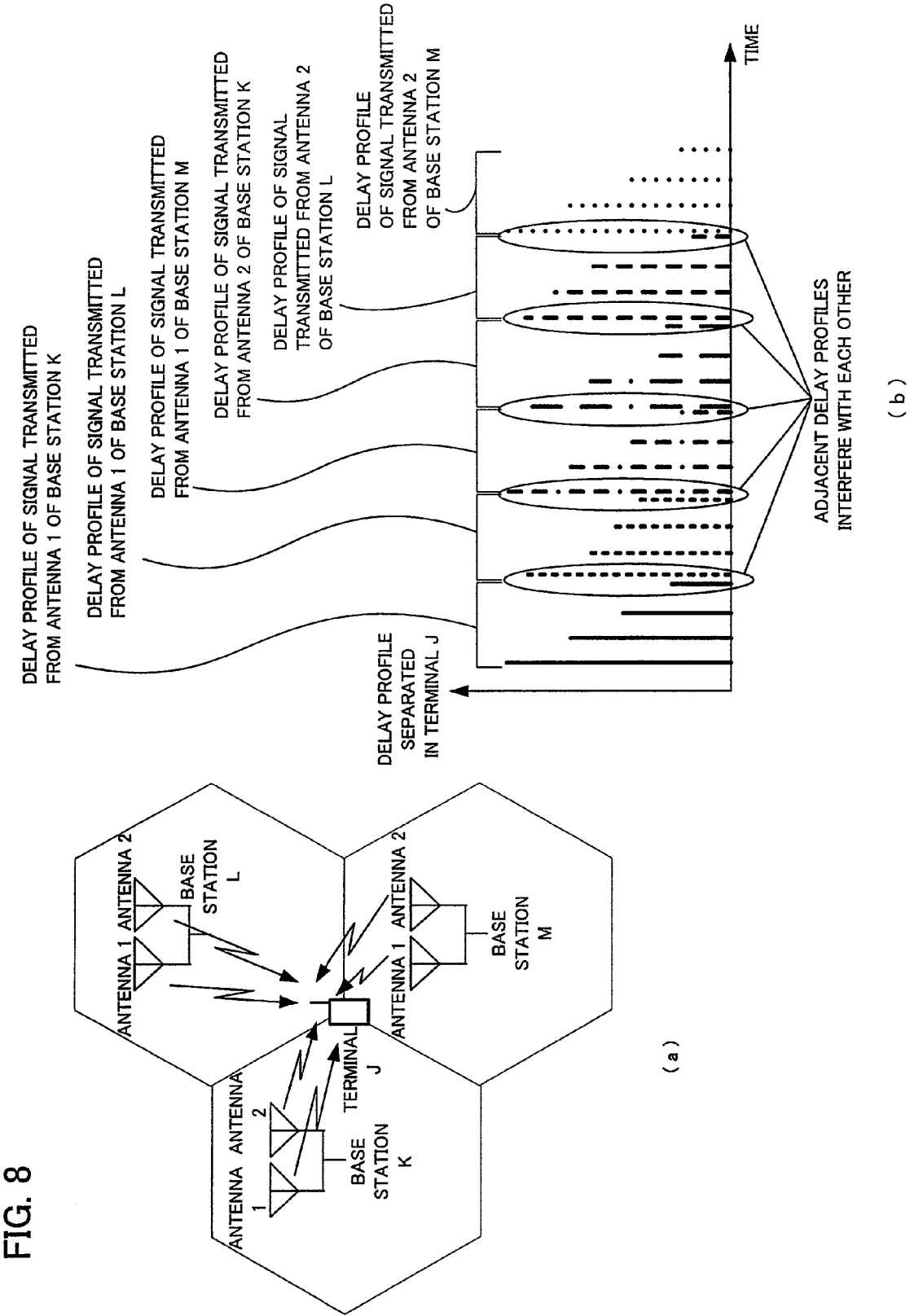
FIG. 8 is a diagram showing a problem when a large number of delay profiles should be separated as an assumption in a radio communication technique according to a fourth embodiment of the present invention.

Otherwise, if it is determined that τmax is larger at step 013, the use of the three antennas in transmission causes interference among the delay profiles in the receiving side (see FIG. 8(*b*)), a channel response cannot be estimated correctly. That is, the delay profiles transmitted from the different antennas of the base station cannot be separated since they interfere with one another. Consequently, in this case, transmission using the three antennas is not performed, but the processing proceeds to step 015 to compare τmax with GI length*½.

If it is determined that τmax is smaller than GI length*½ at step 015 (YES), the amount of phase rotation given to the preambles B transmitted from two transmitting antennas is set as follows: for example, the phase rotating unit 202 sets the amount to 0; and the phase rotating unit 203 sets the amount to the amount of phase rotation in which the amount of time shift is GI length*½. By this setting, the delay profiles can be separated without interfering to one another in the receiving side. Consequently, in this processing, information of the number of transmitting antennas is set to 2 as shown at step 016. Otherwise, if it is determined that τmax is larger than GI length*½ at step 015 (NO), the use of the two antennas in transmission causes interference among the delay profiles in the receiving side (see FIG. 8(*b*)), a channel response cannot be estimated correctly. Consequently, in this case, transmission using the three antennas is not performed, but the processing proceeds to step 017 to set the information of the number of transmitting antennas to 1.

With the above processing, information of the number of transmitting antennas to be fed back to the transmitting side is obtained. This enables to feed back the information of the number of transmitting antennas to the transmitting side using a transmitting device 282 of the receiver (FIG. 10), as shown at step 018. Based on the information of the number of transmitting antennas, the transmitting side generates the same number of information signal streams as the information of the number of transmitting antennas and transmits data packets (steps 003 to 005), so that the receiving device can receive and demodulate the data packets (step 019).

As above, the radio communication technique according to this embodiment can separate a delay profile. Because of this, even in the environment in which delay time of a delay wave arriving at the receiving device varies largely, the appropriate number of transmitting antennas can be selected and channel response can be estimated with high accuracy. That is, the technique has an advantage that can realize stable MIMO transmission. Next, a radio communication technique according to a third embodiment of the present invention will be described with reference to the drawings.

As described above, in the description of the first and second embodiments of the present invention, an example has been shown that the present invention is applied to the configuration in which a transmitting device comprises a plurality of antennas. However, even if each of a plurality of transmitting devices use a single antenna, the transmitting devices are given different phase rotation, so that delay profiles of signals transmitted from the different transmitting devices can also be similarly separated and obtained.

The radio communication technique according to the third embodiment of the present invention is to use said configuration for identification of a base station.

Figure 5:
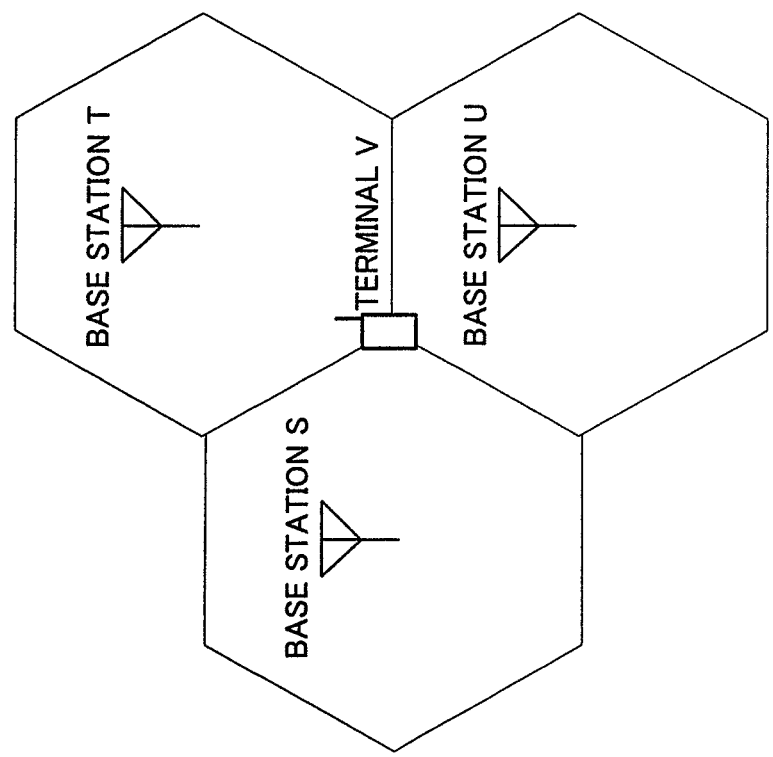
FIG. 5 is a drawing of an example of cell arrangement being a target of a radio communication technique according to a third embodiment of the present invention.

First, an example of cell arrangement for the radio communication technique according to this embodiment is shown in FIG. 5. A base station identification technique will be herein described when a terminal V is positioned at the boundary of cells covered by three base stations S, T and U as shown in FIG. 5. However, all the base stations are synchronized with one another and an identical frequency is used in all the cells herein.

Figure 6:
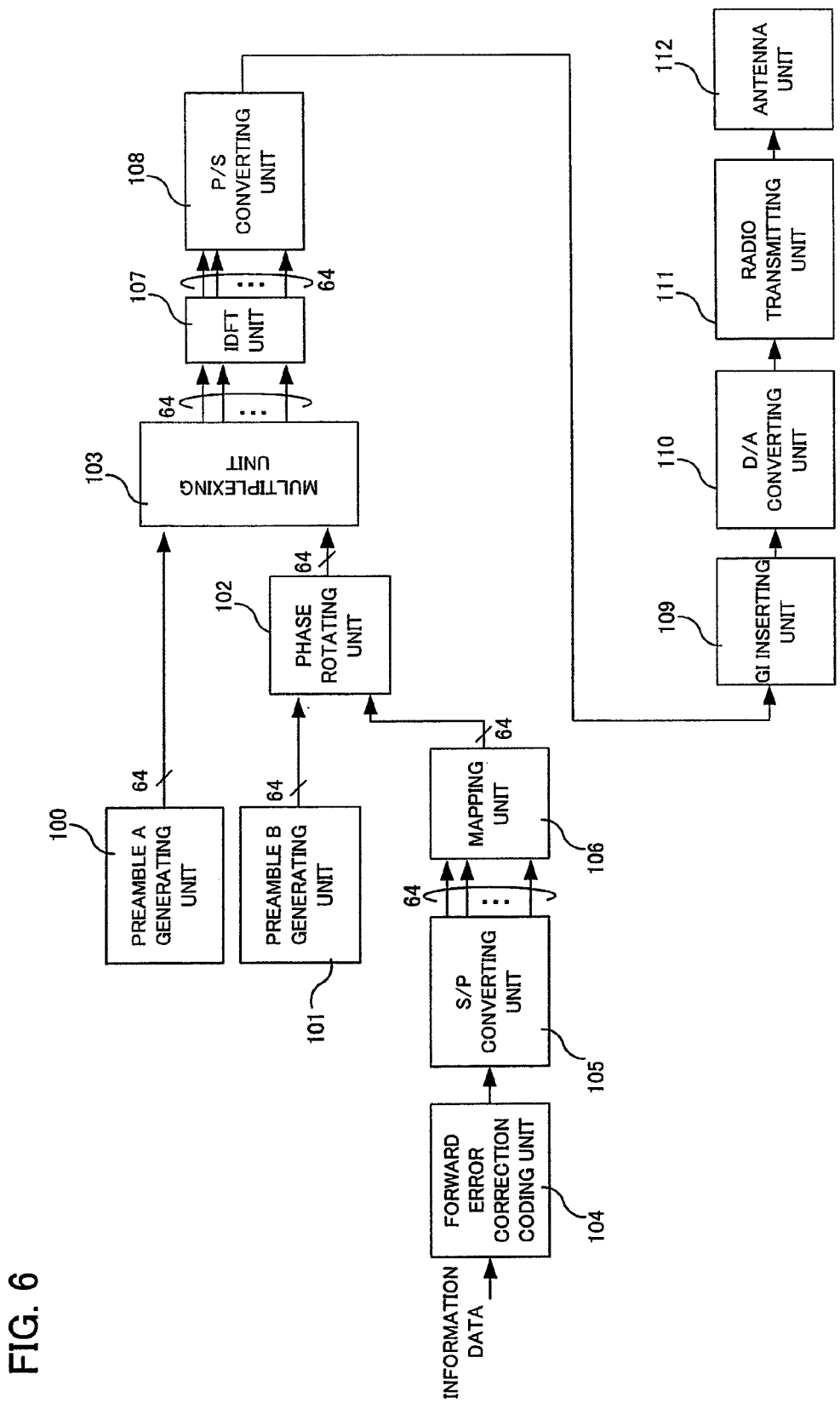
FIG. 6 is a diagram showing a configuration example of a transmitting device of a base station according to the third embodiment of the present invention.

FIG. 6 is a diagram showing a configuration example of a transmitting device of a base station according to this embodiment of the present invention. As shown in FIG. 6, a transmitting device of a base station according to this embodiment includes a preamble A generating unit 100, a preamble B generating unit 101, a phase rotating unit 102, a multiplexing unit 103, an forward error correction coding unit 104, an S/P converting unit 105, a mapping unit 106, an IDFT unit 107, a P/S converting unit 108, a GI inserting unit 109, a D/A converting unit 110, a radio transmitting unit 111 and an antenna unit 112. This configuration example is the same as the first embodiment when the number of transmitting antennas is one. All of the base stations S, T and U have the same configuration in this embodiment.

As shown in FIG. 6, the preamble A generating unit 100 and the preamble B generating unit 101 of the base station device according to this embodiment generate a preamble A and a preamble B, respectively. The preamble A is transmitted to the multiplexing unit 103, while the preamble B is transmitted to the phase rotating unit 102. The phase rotating unit 102 gives continuous phase rotation to subcarriers of the preamble B, the amount of phase rotation given herein is set to values differing among the base stations. That is, for example, the base station S sets the amount of phase rotation to 0, while the base station T sets the amount to $2m\pi$ and the base station U sets the value to $2n\pi$, wherein m and n are integers larger than 1 and satisfying m≠n. The amount of phase rotation is set that differs among base stations as above, allowing for the terminal to separate delay profiles of signals arriving from the base stations and to sense a candidate base station to be connected.

Information data on downlink is transformed to encoded data in the forward error correction coding unit 104 and goes through the S/P converting unit 105 to the mapping unit 106 which maps the encoded data depending on a modulation scheme. However, the information data in the above description is not data for the terminal V, but control information broadcasted to all the cells or data for terminals already connected to the base station. The information data generated in this way is given the same phase rotation as the preamble B in the phase rotating unit 102, and then time-multiplexed with the preamble in the multiplexing unit 103 and transmitted from the antenna unit 112 via the IDFT unit 107, the P/S converting unit 108, the GI inserting unit 109, the D/A converting unit 110 and the radio transmitting unit 111.

Figure 7:
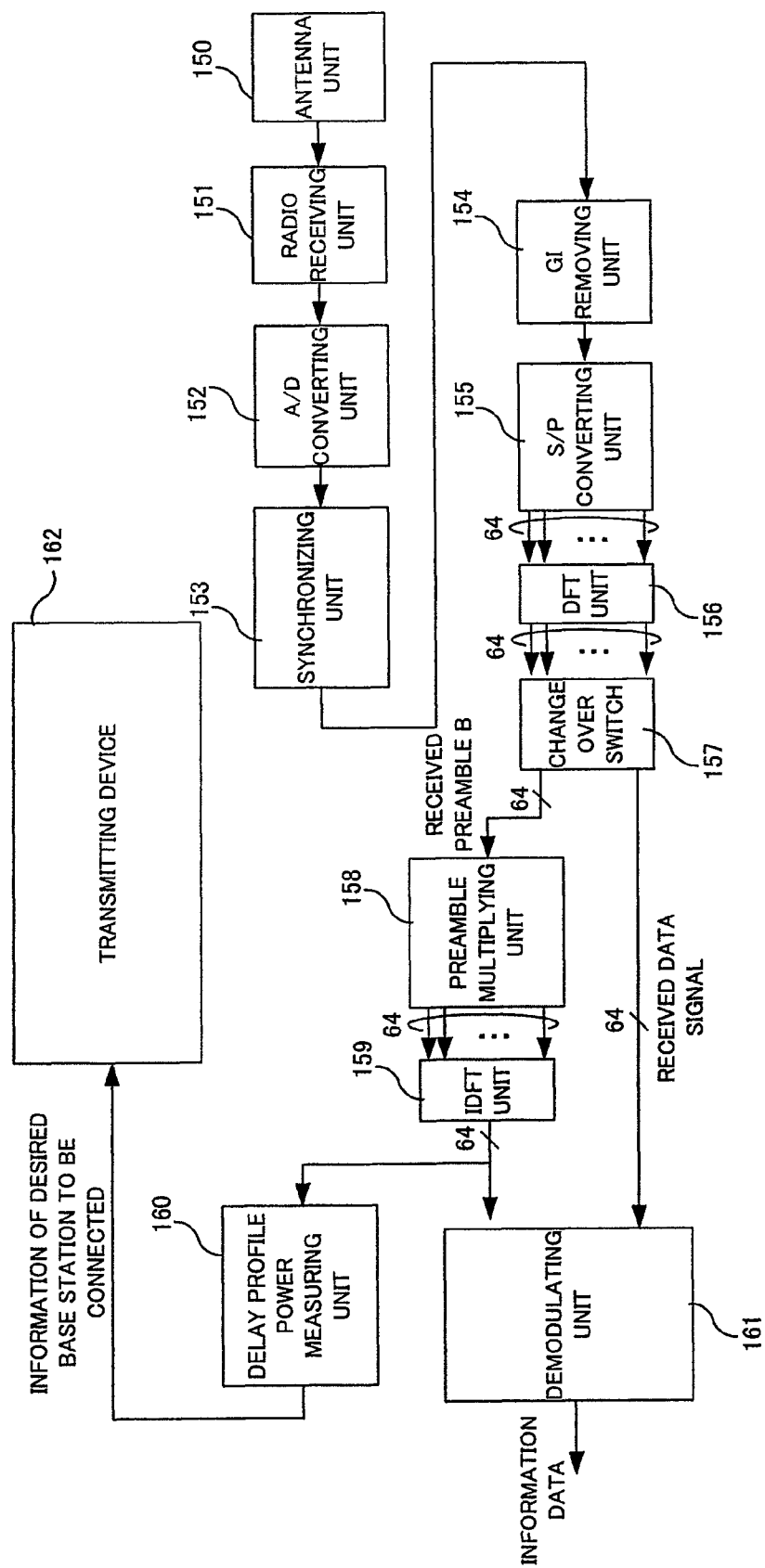
FIG. 7 is a functional block diagram showing a configuration example of a receiving device of a terminal according to the third embodiment of the present invention.

Next, a configuration example of a receiving device of a terminal applied to the radio communication technique according to this embodiment will be described. FIG. 7 is a functional block diagram showing a configuration example of a receiving device of a terminal according to this embodiment of the present invention. As shown in FIG. 7, the receiving device of the terminal according to this embodiment includes an antenna unit 150, a radio receiving unit 151, an A/D converting unit 152, a synchronizing unit 153, a GI removing unit 154, an S/P converting unit 155, a DFT (or FFT) unit 156, a changeover switch 157, a preamble multiplying unit 158, an IDFT (or IFFT) unit 159, a delay profile power measuring unit 160 and a demodulating unit 161. The receiving device of the terminal shown in FIG. 7 includes almost the same configuration as the receiving device of the terminal according to the first embodiment shown in FIG. 3. First, the antenna unit 150 simultaneously receives signals transmitted from the base stations S, T and U. For the received signals in which the signals transmitted from the base stations are mixed, synchronization is established in the synchronizing unit 153 through the radio receiving unit 151 and the A/D converting unit 152.

The synchronizing unit 153 establishes synchronization using the preamble A. Since the preamble A is a common signal to all base stations, synchronization can be established even if signals transmitted from the base stations are mixed in. After establishment of the synchronization, a guard interval of the received signals (the preamble B and information data) is removed in the GI removing unit 154 and the received signals go through the S/P converting unit 155 to the DFT unit 156 which converts the received signals from time domain signals into frequency domain signals.

Next, the changeover switch 157 transmits the received preamble B to the preamble multiplying unit 158 and transmits the received data signals to the demodulating unit 161. The preamble multiplying unit 158 multiplies a value obtained by normalizing a complex conjugate of the preamble B used in the transmitting side by the squared amplitude of the preamble B and the received preamble B. The multiplication result is converted into time domain signals in the IDFT unit 159, obtaining temporally-separated delay profiles of propagation paths through which signals have been transmitted from the base stations S, T and U. This separation is realized by time-shifting the time domain signals for the relation in the equation (7) by applying different phase rotation to the preambles B in a frequency domain in the base stations S, T and U. By applying phase rotation in this way to temporally-separated preambles, a delay profile without suffering interference from other cells can be obtained.

By measuring a delay profile separated for each base station as described in the above, a base station to be a candidate for a connected destination can be sensed. Further, a delay profile separated for each base station is transmitted to the delay profile power measuring unit 160 and the demodulating unit 161. The delay profile power measuring unit 160 measures and compares power of the first-path electric wave for each delay profile, and determines which base station has transmitted a received signal including the highest power. As a result, connection can be attempted to a base station that has transmitted a received signal determined to include the highest power, causing transmission of a signal intended from a transmitting device of a terminal 162 to a base station. On the other hand, the demodulating unit 161 compensates a channel response using a delay profile separated for each base station and demodulates information data such as control information.

With the above configuration, the radio communication system according to this embodiment can identify a base station to be a candidate for a connected destination without being influenced by interference from other cells in an OFDM cellular system in which adjacent cells use an identical frequency. Additionally, by measuring power of a separated delay profile, the system can precisely determine a base station to be connected. Although a base station measured to have high power of the first-path electric wave of a delay profile is selected as a base station being a connected destination in this embodiment, power of all paths can be summed up to select a base station with the highest sum total value.

Also as described above, by simultaneously transmitting preambles given phase rotation differing among base stations, separated delay profiles of signals transmitted from the base stations can be obtained. Based on this, if a terminal connected to a base station is positioned around a cell edge, it is possible to process so as to calculate delay profiles of signals coming from base stations in adjacent cells and detect a base station to be a candidate for a handover destination. In this case, a base station that has transmitted a signal to obtain a delay profile with the highest power is selected as a base station being a handover destination among delay profiles other than that of a connected base station.

Further, in the radio communication system according to this embodiment, a plurality of adjacent base station devices simultaneously transmit data to a certain terminal, realizing easy performance of site diversity (soft combining reception). This allows improvement of receiving feature of a terminal positioned around a cell boundary.

Next, a radio communication technique according to a fourth embodiment of the present invention will be described with reference to the drawings. In the third embodiment of the present invention, base stations in a cellular system transmit preambles given different phase rotation, while a receiving side can separate and measure delay profiles of propagation paths through which signals have been transmitted from the base stations. The third embodiment is characterized by using this to select a connected destination base station based on the separated and measured delay profiles. To apply the characteristics to a system in which each base station includes a plurality of antennas, i.e., a system in which each base station uses a way such as the transmitting antenna selection diversity as shown in the first embodiment, it is required to simultaneously perform identification of a base station and identification and selection of a plurality of antennas provided to the base station. In that case, the number of delay profiles to be separated equals (the number of base stations)×(the number of antennas in each base station), that is, a very large number. When the number of delay profiles to be separated is large as above, the following problems arise. The problems will be described with reference to FIG. 8.

As shown in FIG. 8(a), base stations K, L and M are placed in three cells. Each of the base stations K, L and M includes an antenna 1 and an antenna 2. To apply the first embodiment or the third embodiment described previously in the status that a terminal J is positioned in the vicinity of a boundary among the three cells, phase rotation differing among the antennas of the base stations is given to the preamble B, and the terminal separates delay profiles of propagation paths through which signals are transmitted from the antennas of the base stations. If the profiles to be separated and delay waves are many in the above status, difference in the amount of time shift applied for each antenna decreases. As such, delay profiles after being separated may interfere with one another as shown in FIG. 8(b). In the example shown in FIG. 8(b), the last path in a delay profile of a signal transmitted from the antenna 1 of the base station K interferes with the first path in a delay profile of a signal transmitted from the antenna 1 of the base station L, while other paths cause interference as shown in FIG. 8(b). If adjacent delay profiles interfere with each other as above, identification of a base station and selection of an antenna causes a major error. This means that separation is difficult with the methods of separating a delay profile according to the first embodiment and the third embodiment if the number of delay profiles to be separated is very large. Although the adjacent profiles are represented to slightly overlap to each other on the time axis in the drawing for description, they actually completely overlap and are composed.

The radio communication technique according to the fourth embodiment of the present invention is characterized by applying a manner of separating a delay profile using different preamble patterns to identification of a base station and selection of an antenna, in addition to an approach of time-shifting a time domain signal by giving continuous phase rotation to subcarriers for the above problems.

In a cellular system according to this embodiment in which each base station comprises a plurality of antennas, when a terminal separates delay profiles of signals transmitted from antennas of base stations, the delay profiles of the base stations are separated depending on preamble patterns specific to the base stations. The delay profiles of the antennas in the base stations is first separated using time shift (the amount of phase rotation) similarly to the third embodiment. In this case, the transmitting devices of the base stations are embodied in configuration similar to the configuration shown in FIG. 2. However, in this embodiment, it is necessary to use a pattern specific to a base station for a preamble B. Additionally, the amount of phase rotation in the phase rotating units 012 and 013 is required to be set to values differing among antennas. However, the amount of phase rotation can be set to a common value in a base station.

A receiving device of a terminal according to this embodiment can be also embodied in the configuration shown in FIG. 7. However, in this embodiment, the preamble multiplying unit 158 retains a preamble pattern for each base station (a preamble pattern used for each of the base stations K, L and M in the status shown in FIG. 8). A received signal in which signals transmitted from base stations are mixed is multiplied by each preamble pattern to separate a delay profile of each base station. Assuming that there is no correlation among preamble patterns used in the base stations K, L and M, when the received signal is multiplied by a preamble pattern used in the base station K, delay profiles of signals transmitted from the base stations L and M are in a noisy waveform and only a delay profile of a propagation path through which a signal has been transmitted from the two antennas of the base station K is obtained from the IDFT unit 159.

Similarly, when a received signal is multiplied with a preamble pattern used in the base station L, only a delay profile of a propagation path through which a signal has been transmitted from the two antennas of the base station L is obtained, while when a received signal is multiplied by a preamble pattern used in the base station M, only a delay profile of a propagation path through which a signal has been transmitted from the two antennas of the base station M is obtained. In this way, it is possible not only to separate a delay profile by giving continuous phase rotation to each subcarrier of a preamble in a transmitting side and by shifting a time waveform, but also to separate a delay profile using a different preamble pattern. This enables measuring a delay profile with high accuracy, i.e., identification of a base station or selection of an antenna even when there are very many delay profiles to be separated such as when a base station comprises a plurality of antennas.

Additionally, contrary to this embodiment, an approach can also be used to separate the delay profiles of the base stations by separating delay profiles of antennas using preamble patterns differing among the antennas and applying time shift differing among base stations to preambles.

INDUSTRIAL APPLICABILITY

The present invention is applicable to a radio communication system.

The invention claimed is:

1. A receiving device of a mobile station, the receiving device being configured to process an OFDM signal transmitted from any of a plurality of control station devices each comprising an OFDM transmitting device that is in a respective cell, the OFDM signal consisting of N (N is an integer not less than 2 and satisfying $2^{n-1}<N\leq 2^n$, wherein n is an integer not less than 1) subcarriers, the receiving device comprising:
   a receiving unit configured to receive a symbol to estimate a channel response, the symbol having been transmitted after applying, to each of the subcarriers, a different amount of phase rotation for each control station such that phase difference between adjacent subcarriers is constant;
   a first Fourier transform unit configured to perform a Fourier transform on the received symbol to estimate a channel response;
   a code multiplying unit configured to multiply each subcarrier subjected to Fourier transform by a complex conjugate of a sequence used as the symbol to estimate a channel response at the transmission;
   an inverse Fourier transform unit configured to perform an inverse Fourier transform on said signal and to calculate delay profiles from antennas of each control station;
   a selecting unit configured to select a control station to be connected based on said calculated delay profiles;
   a filtering unit configured to time-filter only a delay profile of a control station to be connected based on said calculated delay profiles; and
   a second Fourier transform unit configured to perform a Fourier transform on said time-filtered signal and estimating a channel response.

2. A reception processing method of a receiving device that receives at least one multicarrier signal from any of a plurality of transmitting devices, the reception processing method comprising:

transmitting, to each transmitting device of said plurality of transmitting devices, information to be used by said each transmitting device to determine an amount of phase rotation for each of subcarriers to estimate each channel response to each transmitting device, where each amount of phase rotation is set for each transmitting device;

receiving at least one signal consisting of a sequence that said each phase rotation is applied for channel response estimation transmitted from said each transmitting device, the sequence which a phase rotation is applied and the sequence which is assigned to each of the subcarriers, wherein phase difference between adjacent subcarriers is fixed; and receiving data which is transmitted from said plurality of transmitting devices at the same timing with the use of the same frequency, and is different among said plurality of transmitting devices; and demodulating the received data, wherein in case that said fixed phase difference between adjacent subcarriers is represented by θ, θ satisfied N×θ=2mπ, wherein N is length of the sequence, and wherein m is an integer not less than 1.

3. The method according to claim 2, further comprising:

receiving sequences transmitted from said plurality of transmitting devices at the same timing with the use of the same frequency.

4. The method according to claim 2, wherein the information to be used by said each transmitting device to determine an amount of phase rotation is information to give different amount of phase rotation among said each transmitting device.

5. A receiving device that receives a multicarrier signal from a transmitting device, the receiving device comprising:

a transmitting unit configured to transmit, to each transmitting device, information to be used by said transmitting device to determine an amount of phase rotation for each of subcarriers to estimate a channel response to said transmitting device, the amount of phase rotation is set for each transmitting device, and to transmit, to a transmitting device; and a receiving unit configured to receive a sequence to estimate a channel response, the sequence which is assigned to each of the subcarriers wherein phase difference between adjacent subcarriers is fixed, wherein in case that said fixed phase difference among the subcarriers is represented by θ, θ satisfied N×θ=2mπ, wherein N is length of the sequence, wherein m is an integer not less than 1, and wherein the receiving unit receives data which is transmitted from a plurality of transmitting devices at the same timing with the use of the same frequency, and is different among the plurality of transmitting devices; and a demodulating unit configured to demodulate the received data.

6. The receiving device according to claim 5, wherein the receiving unit receives sequences transmitted from a plurality of transmitting devices at the same timing with the use of the same frequency.

7. The receiving device according to claim 5, wherein the information to be used by said each transmitting device to determine an amount of phase rotation is information to give different amount of phase rotation among said each transmitting device.

* * * * *